(12) United States Patent
Fujishiro

(10) Patent No.: US 7,042,534 B2
(45) Date of Patent: May 9, 2006

(54) LIGHT CONDUCTOR, LIGHTING APPARATUS, AND LIQUID CRYSTAL DISPLAY

(75) Inventor: Fumihiko Fujishiro, Tokyo (JP)

(73) Assignee: NEC LCD Technologies, Ltd. (JP)

( * ) Notice: Subject to any disclaimer, the term of this patent is extended or adjusted under 35 U.S.C. 154(b) by 115 days.

(21) Appl. No.: 10/140,397

(22) Filed: May 7, 2002

(65) Prior Publication Data

US 2002/0167625 A1 Nov. 14, 2002

(30) Foreign Application Priority Data

May 8, 2001 (JP) .............................. 2001-136950

(51) Int. Cl.
G02F 1/1335 (2006.01)

(52) U.S. Cl. .............................. 349/62; 349/63; 362/31; 362/339

(58) Field of Classification Search .................. 349/62, 349/63, 61–65, 57, 67, 95; 362/31, 339, 330–332; 359/599, 831
See application file for complete search history.

(56) References Cited

U.S. PATENT DOCUMENTS 6,330,386 B1 * 12/2001 Wagner et al. .............. 385/120
6,474,827 B1 * 11/2002 Shinohara et al. .......... 362/607

FOREIGN PATENT DOCUMENTS

JP 2000-19330 A 1/2000

* cited by examiner

*Primary Examiner*—Robert H. Kim
*Assistant Examiner*—Thoi V. Duong
(74) *Attorney, Agent, or Firm*—Hayes Soloway P.C.

(57) ABSTRACT

Light is input into an incident surface portion from a fluorescent lamp, and most of the light propagates in repetition directions. Since a length of an emission portion of the fluorescent lamp is shorter than that of the incident surface portion, there are areas to which no light propagates and dark portions generate in the repetition directions of a string of prisms. Since these dark portion generate out of the display area, a display quality is improved.

13 Claims, 19 Drawing Sheets

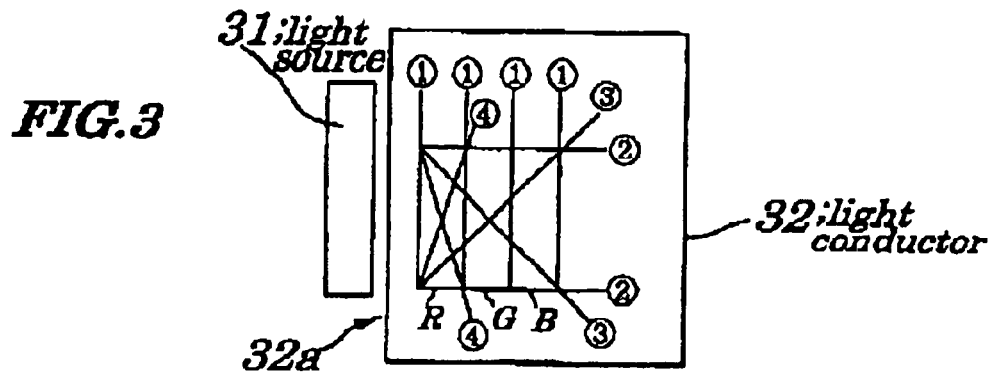
FIG.3
FIG.4
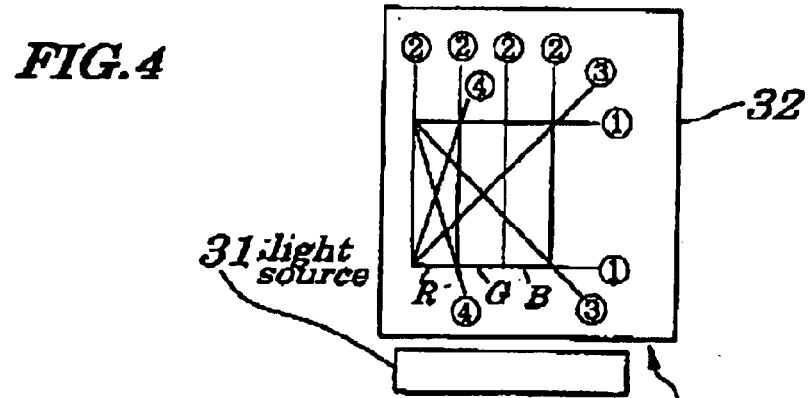
FIG.5
repetition pitch of string of prisms: pixel pitch repetition pitch of string of prisms : pixel pitch =1:2 repetition pitch of string of prisms : pixel pitch=2:3 y-axis: angle at which moire is hard to be recognized
x-axis: repetition pitch of string of prisms when pixel pitch is set to 1 y-axis: moire pitch
x-axis: included angle α [°]
repetition pitch of string of prisms : pixel pitch repetition pitch of string of prisms : pixel pitch=1:2 repetition pitch of string of prisms : pixel pitch = 2:3 repetition pitch of string of prisms: pixel pitch=3:5 repetition pitch of string of prisms when pixel pitch is set to 1

LIGHT CONDUCTOR, LIGHTING APPARATUS, AND LIQUID CRYSTAL DISPLAY

BACKGROUND OF THE INVENTION

1. Field of the Invention

The present invention relates to a light conductor, a lighting apparatus and a liquid crystal display, and more particularly, relates to the light conductor, the lighting apparatus and the liquid crystal display suitable for a to display section of a small electronic apparatus such as a PDA (Personal Digital Assistant).

The present application claims priority of Japanese Patent Application No. 2001-136950 filed on May 8, 2001, which is hereby incorporated by reference.

2. Description of Related Art

A liquid crystal display differs from a luminescent display such as CRT (Cathode Ray Tube) display, PDP (Plasma Display Panel) display and EL (Electro Luminescence) display. The liquid crystal of the liquid crystal display is not luminescent. In the liquid crystal display, characters and images are displayed by adjusting a transmission amount of light from a specific light source.

Liquid crystal displays are divided into two types: a transmission liquid crystal display and a refection liquid crystal display.

In the transmission liquid crystal display, a surface light source such as a fluorescent lamp and an EL is provided on the back of transmission liquid crystal display elements as a light source (back light).

In the reflection liquid crystal display, the display uses surrounding light reflected off a reflecting plate to display data. There are advantages in this type of display because no back light is needed and consumption of power is small. Further, in a well-lit place in direct sunshine, though the clarity of the luminescent display or the transmission liquid crystal display deteriorates, the reflection liquid crystal display is more clear. Therefore, the reflection liquid crystal display is currently used for the popular PDA or mobile computer.

However, since the reflection liquid crystal display uses the surrounding light for the display, display luminance depends on surroundings and the display is not operable in darkness, i.e., night. Particularly, in a reflection liquid crystal display using a color filter, the problem is more severe and strong surrounding light is necessary in comparison with a monochrome liquid crystal display. Though, to solve this problem, a half reflection liquid crystal display using a half mirror has been implemented. But, the method of manufacturing the half mirror is complicated, the light efficiency is low and the display quality is not good. Thus, a solution to the above problem is using a lighting apparatus to light the liquid crystal display when it is dark.

Conventionally, a liquid crystal display, as shown in FIG. 23, is provided with a lighting apparatus 10 and a liquid crystal panel 20. The lighting apparatus 10 is provided with a light source 11 and a light conductor 12. The light source 11 is a fluorescent lamp or a like and supplies light P1 to the light conductor 12. The light conductor 12 is made of polycarbonate resin or the like and is provided with an incident surface portion 12a, a prism surface portion 12b and an outgoing surface portion 12c. The light P1 from the light source 11 is input from the incident surface portion 12a and is reflected off the prism surface portion 12b. Reflected light P2 is output from the outgoing surface portion 12c. Reflected light P3 is input from the outgoing surface portion 12c and is output from the prism surface portion 12b to a viewpoint of an observer.

The liquid crystal panel 20 is provided with a polarizing plate+compensating plate 21, a glass substrate 22, a color filter 23, liquid crystal 24, a reflecting plate 25 and a glass substrate 26. Further, the color filter 23 is formed on the glass substrate 22, and the reflecting plate 25 is formed on the glass substrate 26. The liquid crystal panel 20 receives the reflected light P2, performs control corresponding to a display screen and reflects the reflected light P2 so as to output the reflected light P3 to the light conductor 12. The liquid crystal panel 20 also reflects external incident light received through the light conductor 12 from the viewpoint of an observer by the reflecting plate 25 so as to output the reflected light.

FIG. 24A and FIG. 24B are detailed view showing the light apparatus 10 in FIG. 23. FIG. 24A is a view indicated by an arrow A of the lighting apparatus 10 in FIG. 23. FIG. 24B is a sectional view along a line c—c in FIG. 24A. FIG. 24A also shows a view indicated by the arrow A of the liquid crystal panel 20.

In the lighting panel 10, as shown in FIG. 24A, a string of prisms are formed on the prism surface portion 12b of the light conductor 12. The string of prisms are provided with propagation portions 12m, 12m ..., 12m for propagating the light P1 and refection portions 12n, 12n ... 12n for reflecting the propagated light P1 which are repeatedly formed in a density corresponding to a pixel density of a display screen of thee liquid crystal panel 20. An included (inclination) angle θ is set between a direction vertical to a repetition direction of a string of prisms and the incident surface portion 12a. As shown in FIG. 24B, in the string of prisms, a repetition pitch P, a width W between the reflection portions 12n and a depth D of the repetition portion 12n are set.

FIG. 25 is a view showing the lighting apparatus 10 viewed from the arrow A when the included angle B in FIG. 24A is set to 0°. In the lighting apparatus 10, the included angle θ is set to 0°, and the string of prisms are repeatedly formed in a vertical direction to the incident surface portion 12a. The light source 11 is provided with a fluorescent lamp 11a, a length Z of an emission portion is shorter than a length of the incident surface portion 12a in order to make a frame of the liquid crystal display small.

FIG. 26 is a view showing the light apparatus 10 indicated by the arrow A when the fluorescent lamp 11a in FIG. 25 is emitting.

As shown in FIG. 26, the light P1 is input into the incident surface portion 12a from the fluorescent lamp 11a and is propagated in the light conductor 12. In this case, since the length Z of the emission portion of the fluorescent lamp 11a is shorter than the length of the incident surface portion 12a, there are areas to which no light is propagated and a rectangular dark portion B1 and a rectangular dark portion B2 are generated at both sides of the light conductor 12. Widths of the rectangular dark portion B1 and the rectangular dark portion B2 reduce in proportion to a distance from the incident surface portion 12a caused by diffraction of the light P1.

FIG. 27 is a view showing another conventional liquid crystal display. The same numerals are applied to the same elements in FIG. 23.

The liquid crystal display is provided with a lighting apparatus 10A different from the lighting apparatus 10 in FIG. 23 instead of the lighting apparatus 10. The lighting apparatus 10A is provided with a light conductor 12A of which a repetition direction of a string of prisms is different (namely, included angle θ≠0°) instead of the light conductor 12 in FIG. 23.

FIG. 28 is a view showing the lighting apparatus 10A viewed from the arrow A, and the same numerals are applied to the same elements in FIG. 25.

In the lighting apparatus 10A, a string of prisms are repeated in a direction inclined to the incident surface portion 12a.

FIG. 29 is a view showing the light apparatus 10A indicated by the arrow A when the fluorescent lamp 11a in FIG. 28 is emitting. FIG. 30 is a detailed view showing a dark portion C and a dark portion D in FIG. 29.

As shown in FIG. 29, the light P1 is input into the incident surface portion 12a from the fluorescent lamp 11a and is propagated in the light conductor 12A. In this case, since the length Z of the emission portion of the fluorescent lamp 11a is shorter than the length of the incident surface portion 12a, there are areas to which no light is propagated and a dark portion C1 and a dark portion C2 are generated in the repetition direction of the string of prisms.

In other words, as shown in FIG. 30, since most of the light P1 of the fluorescent lamp 11a propagates in the repetition direction W of the string of prisms (namely, included θ+90°), dispersion light P11 of the light P1 propagates in the repetition direction W and dispersion light 12P transmits through an end surface. Therefore, the dark portion C generates only at one corner contact with the incident surface portion 12a of the light conductor 12A. Further, since dispersion light P13 and dispersion light P14 propagate in the repetition direction W and dispersion light P15 and dispersion light P16 transmit through an end surface, the dark portion generates from another corner contact with the incident surface portion 12a of the light conductor 12A in the repetition direction of the string of prisms.

However, there are following problems in the conventional liquid crystal displays.

In the liquid crystal display shown in FIG. 23, as shown in FIG. 26, the rectangular dark portion B1 and the rectangular dark portion B2 generate in the light conductor 12, and further there is a case in that moire stripes generate according to the pixel density of the liquid crystal panel 20. Therefore, there is a problem in that a display quality of the liquid crystal panel 20 remarkably deteriorates.

Also, in the liquid crystal display shown in FIG. 27, as shown in FIG. 29, the dark portion C and the dark portion D generate. There is no problem about the dark portion C by setting the dark portion out of a display area. However, since the dark portion D generates in the display area, there is a problem in that a display quality remarkably deteriorates. To solve these problems, it is considered that the length Z of the emission portion of the fluorescent lamp 11a is longer than the length of the incident surface portion 12a. However, when the length Z of the emission portion is longer than the length of the incident surface portion 12a, a whole length of the fluorescent lamp 11a becomes long, there are problems in that a configuration of the liquid crystal display becomes large and it is difficult to make a frame small.

Further, Japanese Patent Application Laid-Open No. 2000-19330 discloses a technique for preventing the moire stripes. In this technique, since a repetition direction of a string of prisms to prevent the moire stripes is considered about only a square pixel unit and not considered about a RGB cell, there is a possibility in that moire stripes generate under a specific display such as whole blue display, whole red display or whole green display. Therefore, the consideration is not satisfied.

SUMMARY OF THE INVENTION

In view of the above, it is an object of the present invention to provide a light conductor and a lighting apparatus capable of preventing moire stripes from generating and of preventing dark portions from generating in a display area and to provide a liquid crystal display capable of making a frame small.

According to a first aspect of the present invention, there is provided a light conductor provided with an incident surface portion, a prism surface portion and an outgoing surface portion, inputting light given from an external via the incident surface portion, reflecting the light by the prism surface portion and outputting a first reflected light to an object of lighting up from the outgoing surface portion, and inputting a second reflected light reflected off the object via the outgoing surface portion and outputting the second reflected light to a viewpoint of an observer, wherein the prism surface portion has a string of prisms in which propagation portions for propagating the light which is given and reflection portions for reflecting the light which is propagated are regularly repeatedly formed, a repetition direction of the string of prisms, in a predetermined area contact with the incident surface portion and contact with one end surface adjacent to the incident surface portion, is set in a first inclination direction inclining from the incident surface portion to the one end surface and in an area except the predetermined area, is set a second inclination direction inclining from the incident surface portion to another end surface.

In the foregoing, a preferable mode is one wherein an included (inclination) angle α between a vertical direction of the first inclination direction and the incident surface portion and an included (inclination) angle β between a vertical direction of the second inclination direction and the incident surface portion are set as follows:

$$20°≤α≤35° \text{ and } 20°≤β≤35$$

Also, a preferable mode is one wherein on a border between the predetermined area and the area except the predetermined area, a height of the prism surface portion in the predetermined area is equal to a height of the prism surface portion in the area except the predetermined area.

According to a second aspect of the present invention, there is provided a lighting apparatus including a light source and a light conductor, the light conductor including; an incident surface portion, a prism surface portion and an outgoing surface portion, hereby inputting light supplied from a light source via the incident surface portion, reflecting on the prism surface portion the input light as a first reflected light and outputting the first reflected light to an object of lighting up from the outgoing surface portion, and inputting a second reflected light reflected off the object via the outgoing surface portion and outputting the second reflected light to a viewpoint of an observer, wherein the prism surface portion has a string of prisms in which propagation portions for propagating the light which is given and reflection portions for reflecting the light which is propagated are regularly repeatedly formed, a repetition direction of the string of prisms, in a predetermined area contact with the incident surface portion and contact with one end surface adjacent to the incident surface portion, is set in a first inclination direction inclining from the incident surface portion to the one end surface and in an area except the predetermined area, is set a second inclination direction inclining from the incident surface portion to another end surface.

According to a third aspect of the present invention, there is provided a lighting apparatus including a light source having an emission portion of a predetermined length and a light conductor, the light conductor including; an incident surface portion which is longer than the emission portion of the light source, a prism surface portion and an outgoing surface portion, hereby inputting light supplied from a light source via the incident surface portion, reflecting on the prism surface portion the input light as a first reflected light and outputting the first reflected light to an object of lighting up from the outgoing surface portion, and inputting a second reflected light reflected off the object via the outgoing surface portion and outputting the second reflected light to a viewpoint of an observer, wherein the prism surface portion has a string of prisms in which propagation portions for propagating the light which is given and reflection portions for reflecting the light which is propagated are regularly repeatedly formed, a repetition direction of the string of prisms, in a predetermined area contact with the incident surface portion and contact with one end surface adjacent to the incident surface portion, is set in a first inclination direction inclining from the incident surface portion to the one end surface and in an area except the predetermined area, is set a second inclination direction inclining from the incident surface portion to another end surface.

In the foregoing, a preferable mode is one wherein an included angle α between a vertical direction of the first inclination direction and the incident surface portion and an included angle β between a vertical direction of the second inclination direction and the incident surface portion are set as follows:

$20°≦α≦35°$ and $20°≦β≦35$

According to a fourth aspect of the present invention, there is provided A liquid crystal display including:

a light source;

a light conductor including; an incident surface portion, a prism surface portion and an outgoing surface portion, hereby inputting light supplied from a light source via the incident surface portion, reflecting on the prism surface portion the input light as a first reflected light and outputting the first reflected light from the outgoing surface portion, and inputting a second reflected light via the outgoing surface portion and outputting the second reflected light to a viewpoint of an observer; and a liquid crystal panel for inputting the first reflected light and for performing control corresponding to a display screen so as to reflect light, and for outputting the second reflected light to the light conductor, wherein the prism surface portion has a string of prisms in which propagation portions for propagating the light which is given and reflection portions for reflecting the light which is propagated are regularly repeatedly formed, a repetition direction of the string of prisms, in a predetermined area contact with the incident surface portion and contact with one end surface adjacent to the incident surface portion, is set in a first inclination direction inclining from the incident surface portion to the one end surface and in an area except the predetermined area, is set a second inclination direction inclining from the incident surface portion to another end surface.

According to a fifth aspect of the present invention, there is provided a liquid crystal display including:

a light source having an emission portion of a predetermined length;

a light conductor including; an incident surface portion which is longer than the emission portion of the light source, a prism surface portion and an outgoing surface portion, hereby inputting light supplied from a light source via the incident surface portion, reflecting on the prism surface portion the input light as a first reflected light and outputting the first reflected light from the outgoing surface portion, and inputting a second reflected light reflected via the outgoing surface portion and outputting the second reflected light to a viewpoint of an observer; and a liquid crystal panel for inputting the first reflected light and for performing control corresponding to a display screen so as to reflect light, and for outputting the second reflected light to the light conductor, wherein the prism surface portion has a string of prisms in which propagation portions for propagating the light which is given and reflection portions for reflecting the light which is propagated are regularly repeatedly formed, a repetition direction of the string of prisms, in a predetermined area contact with the incident surface portion and contact with one end surface adjacent to the incident surface portion, is set in a first inclination direction inclining from the incident surface portion to the one end surface and in an area except the predetermined area, is set a second inclination direction inclining from the incident surface portion to another end surface.

In the foregoing, a preferable mode is one wherein an included angle α between a vertical direction of the first inclination direction and the incident surface portion and an included angle β between a vertical direction of the second inclination direction and the incident surface portion are set as follows:

$20°≦α≦35°$ and $20°≦β≦35$.

Also, a preferable mode is one wherein the predetermined area in the prism surface portion is arranged except an area corresponding to the display screen.

According to a sixth aspect of the present invention, there is provided a liquid crystal display including:

a liquid crystal panel having display cells arranged in lattices made by a plurality of first lines arranged in parallel one another at intervals of "a" and a plurality of second lines perpendicular to the first lines in parallel one another at intervals of "3×a", for inputting a first reflected light and performing control corresponding a display screen so as to reflect light and for outputting a second reflected light;

a light source; and a light conductor provided with an incident surface portion being parallel to the first lines, a prism surface portion and an outgoing surface portion, inputting light supplied from a light source via the incident surface portion, reflecting the light by the prism surface portion and outputting a first reflected light to an object of lighting up from the outgoing surface portion, and inputting a second reflected light reflected off the object via the outgoing surface portion and outputting the second reflected light to a viewpoint of an observer, wherein the prism surface portion has a string of prisms in which propagation portions for propagating the light which is given and reflection portions for reflecting the light which is propagated are regularly repeatedly formed, a repetition direction of the string of prisms, in a predetermined area contact with the incident surface portion and contact with one end surface adjacent to the incident surface portion, is set in an inclination direction inclining from the incident surface portion to the one end surface, and an included angle α between a vertical direction of the inclination direction and the incident surface portion is set as follows:

$$20° \leq \alpha \leq 35°$$

In the foregoing, a preferable mode is one wherein the included angle α between a vertical direction of the inclination direction and the incident surface portion is set as follows:

$$25° \leq \alpha \leq 35°$$

According to a seventh aspect of the present invention, there is provided a liquid crystal display including:

a liquid crystal panel having display cells arranged in lattices made by a plurality of first lines arranged in parallel one another at intervals of "a" and a plurality of second lines perpendicular to the first lines in parallel one another at intervals of "3×a", for inputting a first reflected light and performing control corresponding a display screen so as to reflect light and for outputting a second reflected light;

a light source; and a light conductor provided with an incident surface portion being parallel to the second lines, a prism surface portion and an outgoing surface portion, inputting light supplied from a light source via the incident surface portion, reflecting the light by the prism surface portion and outputting a first reflected light to the liquid crystal panel from the outgoing surface portion, and inputting a second reflected light reflected off the object via the outgoing surface portion and outputting the second reflected light to a viewpoint of an observer, wherein the prism surface portion has a string of prisms in which propagation portions for propagating the light which is given and reflection portions for reflecting the light which is propagated are regularly repeatedly formed, a repetition direction of the string of prisms, in a predetermined area contact with the incident surface portion and contact with one end surface adjacent to the incident surface portion, is set in an inclination direction inclining from the incident surface portion to the one end surface, and an included angle α between a vertical direction of the inclination direction and the incident surface portion is set as follows:

$$20° \leq \alpha \leq 38°$$

In the foregoing, a preferable mode is one wherein the included angle α between a vertical direction of the inclination direction and the incident surface portion is set as follows:

$$20° \leq \alpha \leq 30°$$

Also, a preferable mode is one wherein a repetition cycle P of the string of prisms is set as follows:

$$0.4 \times 3 \times a \leq P \leq 1 \times 3 \times a.$$

Furthermore, a preferable mode is one wherein a repetition cycle P of the string of prisms is set as follows:

$$0.5 \times 3 \times a \leq P \leq 0.8 \times 3 \times a.$$

With the above configurations, the reputation directions of a string of prisms are set in the first inclination direction and the second inclination direction, generation of moire stripes is avoided and dark portions generate out of the display area. Therefore, it is possible to improve the display quality in the liquid crystal display of which the frame is made small. Further, since the liquid crystal display is attached to the electronic apparatus, it is possible to improve the display quality without generation of moire stripes and dark portions though the display section is made small.

BRIEF DESCRIPTION OF THE DRAWINGS

The above and other objects, advantages, and features of the present invention will be more apparent from the following description taken in conjunction with the accompanying drawings in which:

FIG. 3 is a schematic view showing a direction of RGB stripes of a liquid crystal element;

FIG. 4 is a schematic view showing a direction of RGB stripes of a liquid crystal element;

FIG. 5 is a graph showing a generation state of moire stripes;

DETAILED DESCRIPTION OF THE PREFERRED EMBODIMENTS

Best modes for carrying out the present invention will be described in further detail using embodiments with reference to the accompanying drawings.

First Embodiment

Figure 1:
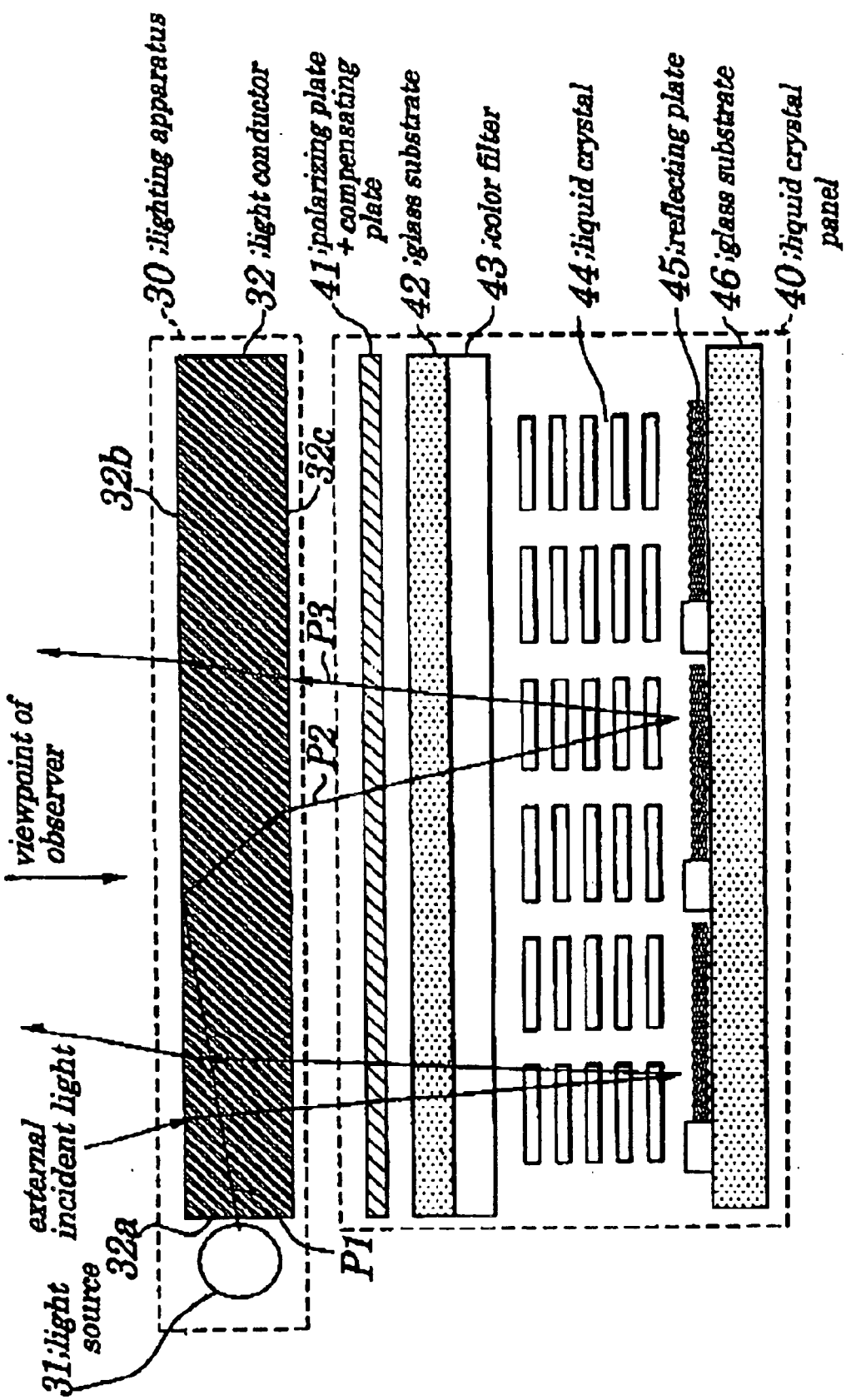
FIG. 1 is a structural view showing a liquid crystal display according a first embodiment of the present invention.

FIG. 1 is a structural view showing a liquid crystal display according a first embodiment of the present invention.

The liquid crystal display, as shown in FIG. 1, is provided with a lighting apparatus 30 and a liquid crystal panel 40 to be lighted. The lighting apparatus 30 is provided with a light source 31 and a light conductor 32. The light source 31 is a fluorescent lamp or a like and supplies light P1 to the light conductor 32. The light conductor 32 is made of polycarbonate resin or a like and is provided with an incident surface portion 32a, a prism surface portion 32b and an outgoing surface portion 32c which are substantially formed in plain surfaces. The light P1 from the light source 31 is input from the incident surface portion 32a and is reflected off the prism surface portion 32b. Reflected light P2 is output from the outgoing surface portion 32c. Reflected light P3 is input from the outgoing surface portion 32c and is output from the prism surface portion 32b to a viewpoint of an observer.

The liquid crystal panel 40 is a reflection type and is provided with a polarizing plate+compensating plate 41, a glass substrate 42, a color filter 43, liquid crystal 44, a reflecting plate 45 and a glass substrate 46. Further, the color filter 43 is formed on the glass substrate 42, and the reflecting plate 45 is formed on the glass substrate 46. The liquid crystal panel 40 receives the reflected light P2, performs control corresponding to a display screen and reflects the reflected light P2 so as to output the reflected light P3 to the light conductor 32. The liquid crystal panel 40 also reflects external incident light received through the light conductor 32 from the viewpoint of an observer by the reflecting plate 45.

Figure 2:
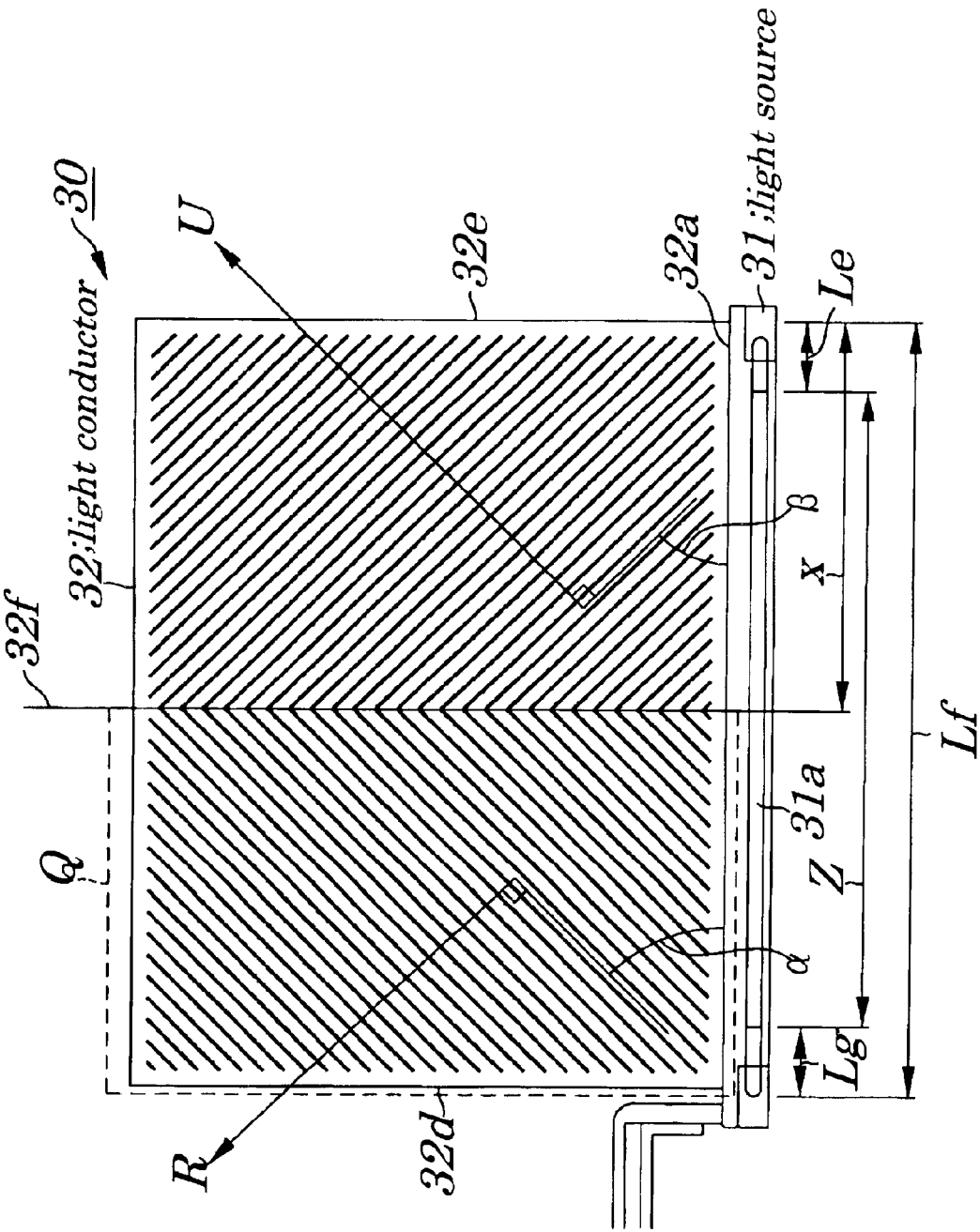
FIG. 2 is a view showing a lighting apparatus 30 indicated by an arrow A in FIG. 1.

FIG. 2 is a view showing the light apparatus 30 indicated by the arrow A.

In the lighting apparatus 30, as shown in FIG. 2, the light source 31 is provided with a fluorescent lamp 31a. A length Z of an emission portion of the fluorescent lamp 31a is shorter than the length of the incident surface portion 12a to make a frame small.

Figure 24A:
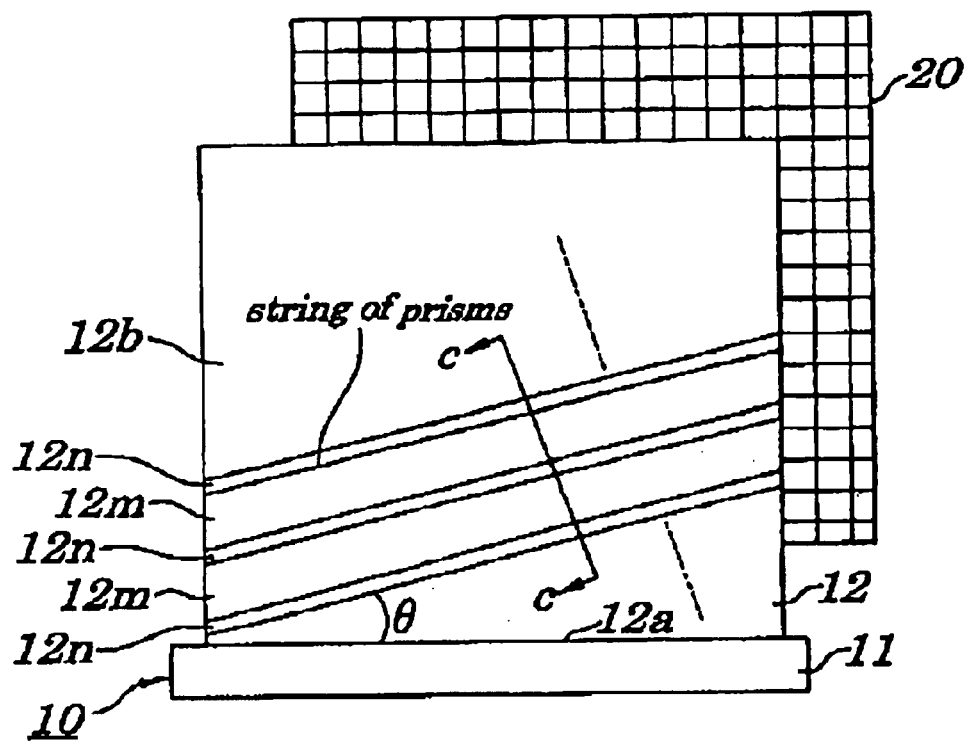
FIGS. 24A and 24B are detailed views showing a lighting apparatus 10 in FIG. 23.
Figure 24B:
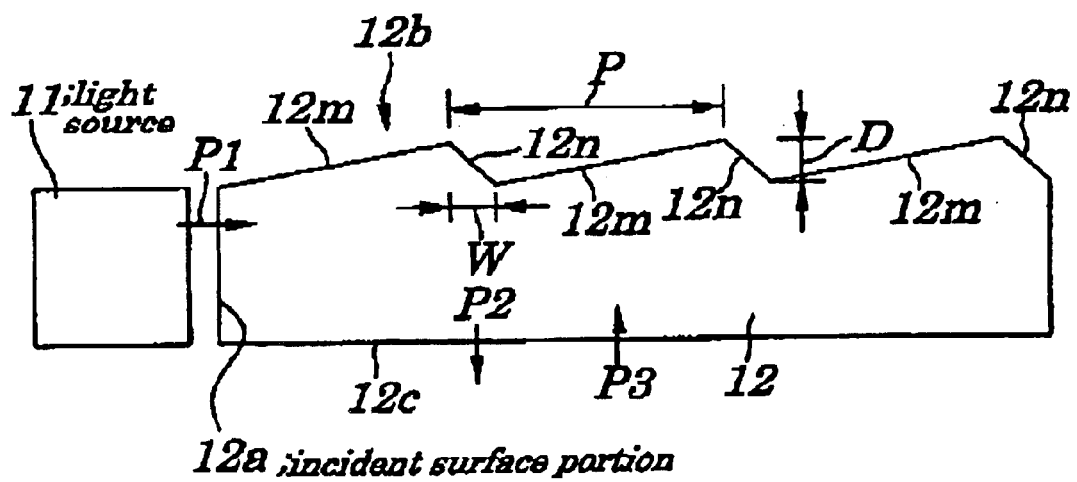
Figure 25:
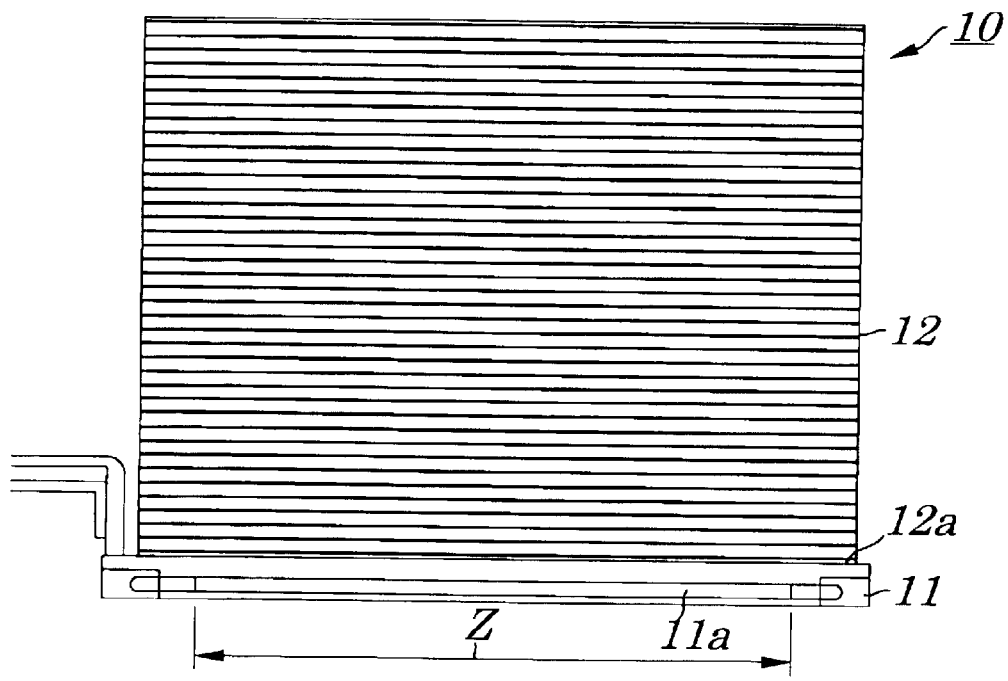
FIG. 25 is a view showing the lighting apparatus 10 indicated by an arrow A when an included angle θ is set to 0°.
Figure 26:
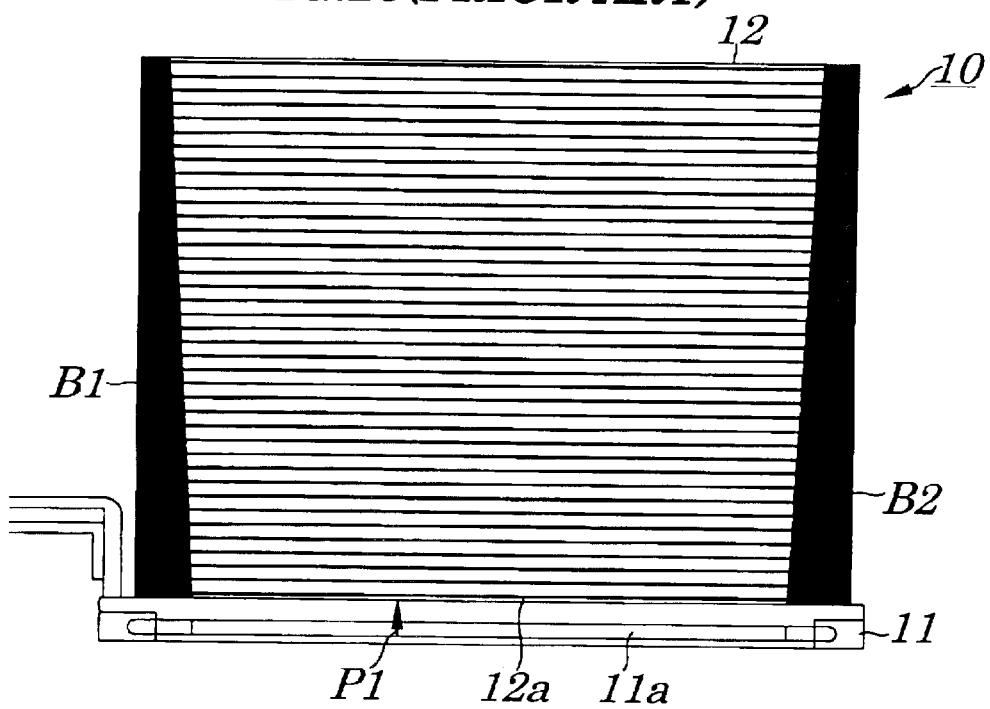
FIG. 26 is a view showing a lighting apparatus 10 indicated by an arrow A when a fluorescent lamp 11a in FIG. 25 is emitting.
Figure 27:
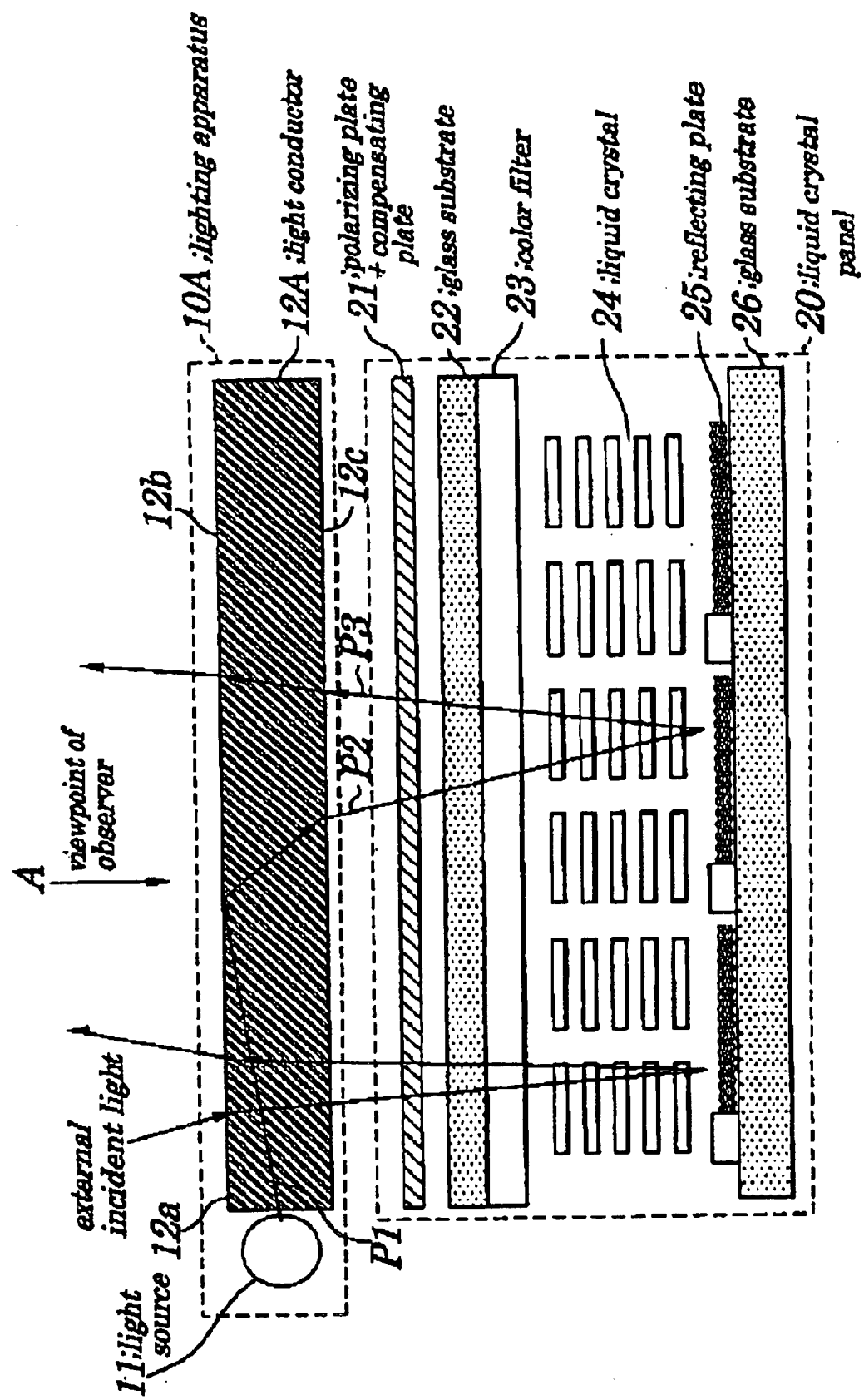
FIG. 27 a structural view showing another conventional liquid crystal display.
Figure 28:
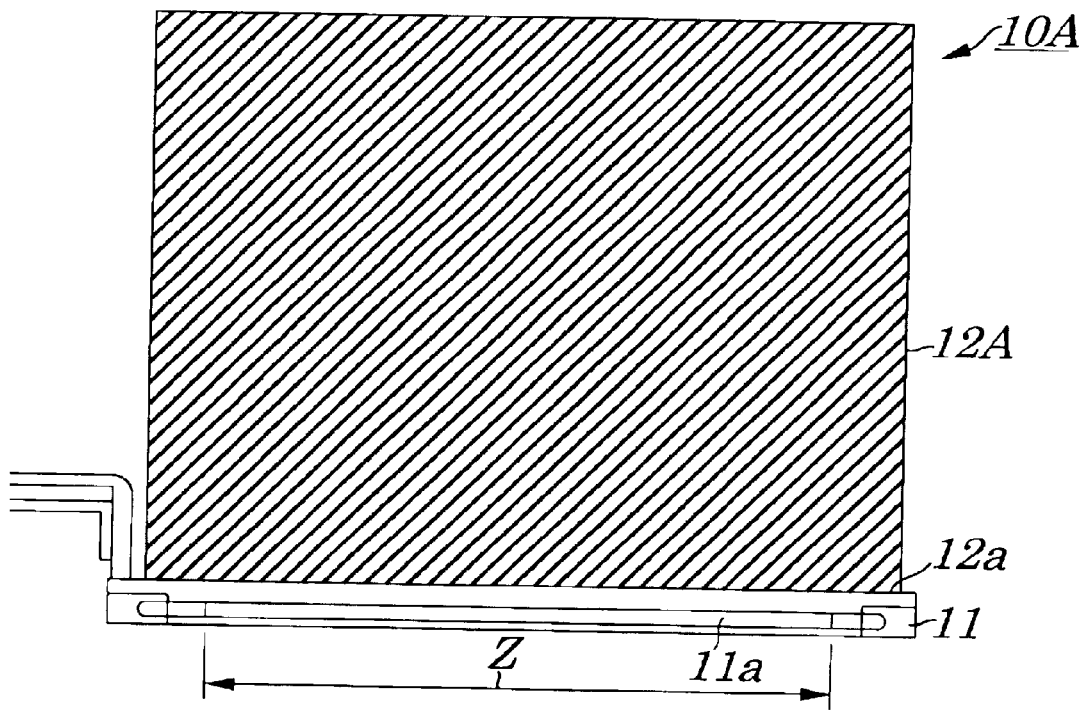
FIG. 28 is a view showing a lighting apparatus 10A indicated by an arrow A.
Figure 29:
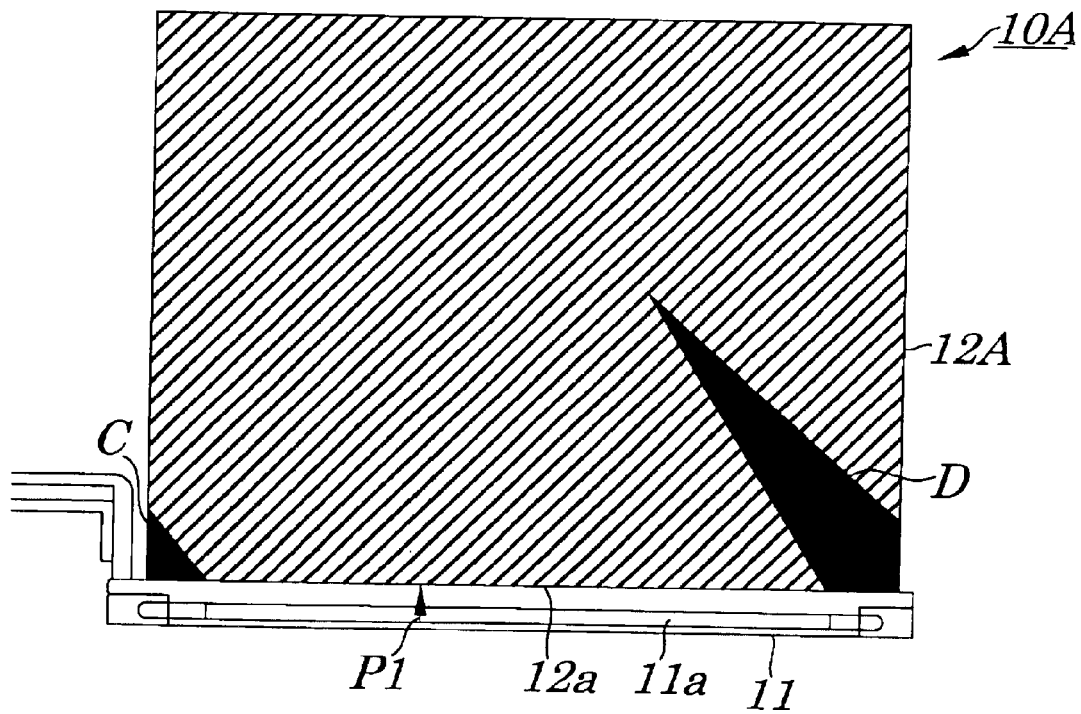
FIG. 29 is a view showing a lighting apparatus 10A indicated by an arrow A when a fluorescent lamp 11a in FIG. 27 is emitting.
Figure 30:
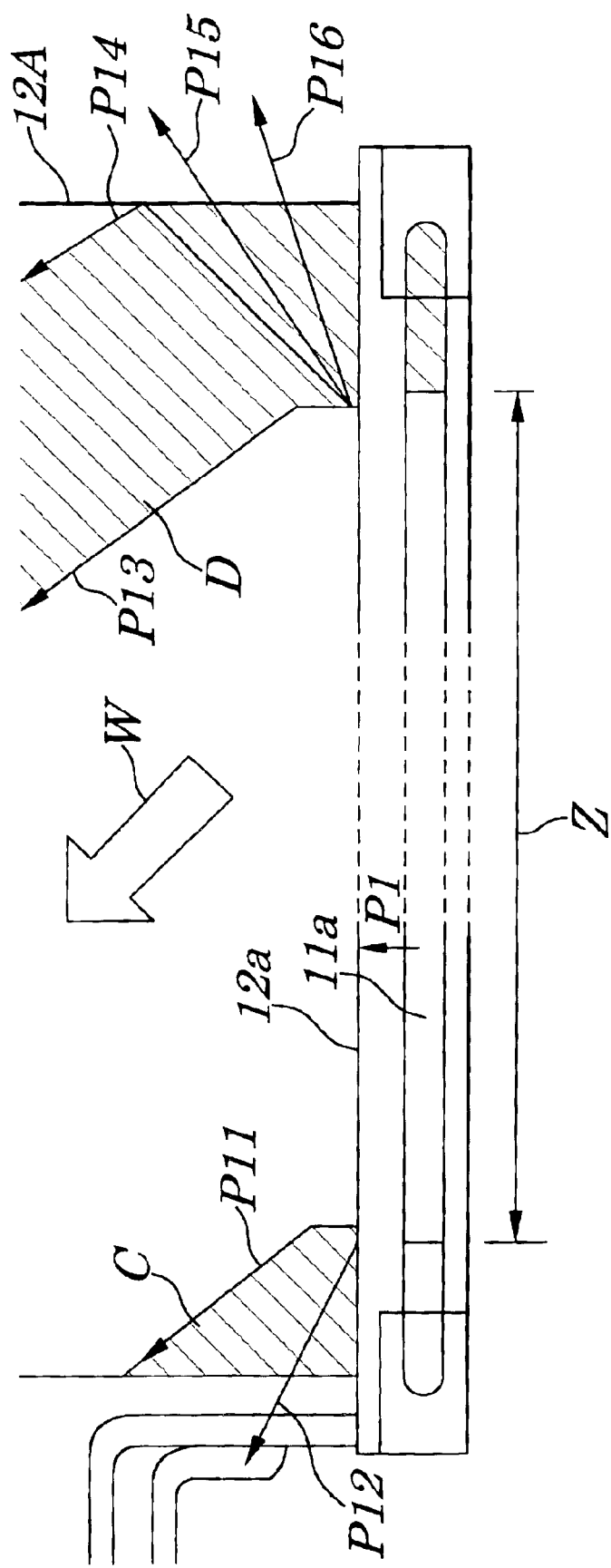
FIG. 30 is a detailed view showing a dark portion C and a dark portion D in FIG. 29.

A prism surface portion of the light conductor 32, similarly to the conventional technique shown in FIG. 24, is provided with a string of prisms in which propagation portion for propagating the light P1 from the light source 31 and reflection portions for reflecting propagated light are formed repeatedly in a cycle corresponding to a display screen.

Then, as to the repetition direction of the string of prisms, in a predetermined area (such as an area Q) contact with the incident surface portion 32a and one end surface 32d adjacent to the incident surface portion 32a, a first inclined direction R inclining from the incident surface portion 32a to the one end surface 32d is set and, in an area except the predetermined area Q. a second inclined direction R inclining from the incident surface portion 32a to another end surface 32e is set. Then, an included angle α is set between a vertical direction of the first inclined direction R and the incident surface portion 32a, and an included angle β is set between a vertical direction of the inclined direction U and the incident surface portion 32a.

The predetermined area Q is an area between a position of a distance x from the another end surface 32e and the one end surface 32d. The distance x is set as follows:

$$Lf - Lg \geq x \geq Le,$$

where Le is a distance of non-emission portion of the fluorescent lamp 11a from the another end surface 32e, Lf is a length of the incident surface portion 32a, and Lg is a distance of non-emission portion of the fluorescent lamp 11a from the one end surface 32d.

In a border line 32f between the predetermined area Q and an area except the predetermined area Q, it is important that heights of the propagation portions and the reflection portions in the predetermined area Q are equal to those in the area except the predetermined area Q, namely, that the heights of the propagation portions and the reflection portions have no difference in the border line 32f. When there are differences, propagation light and reflection light become discontinuous, and the differences are recognized as bright lines or dark lines.

FIG. 3 and FIG. 4 are schematic views showing directions of RGB stripes in the liquid crystal element.

Each pixel of the liquid crystal panel 40, as shown in FIG. 3 and FIG. 4, is structured as RGB stripes. In a horizontal direction, a R (red) display cell, a G (green) display cell and a B (blue) display cell are arranged to make a one pixel. A ratio of a vertical length to a horizontal length in each display cell is 3:1, and a ratio of a vertical length to a horizontal length in a pixel including three RGB display cells is 1:1. In a display for an information system, this pixel structure is usually used.

In FIG. 3 and FIG. 4, respective display cells are arranged on lattices made by a plurality of first lines arranged in parallel one another at intervals of "a" and a plurality of second lines arranged perpendicularly to the first lines in parallel one another at intervals of "3×a". A horizontal length of each display cell is set to "a" and a vertical length is set to "3×a", and then one pixel is a square pixel of which one length is "3×a".

FIG. 3 schematically shows that the direction of the RGB stripes is parallel with the incident surface portion 32a of the light conductor 32. FIG. 4 schematically shows that the direction of the RGB stripes is vertical to the incident surface portion 32a of the light conductor 32. Further, as shown in FIG. 3 or FIG. 4, a longitudinal direction of the light source 31 of an emission portion having a predetermined length is arranged in parallel with the incident surface portion 32a. Either arrangement in FIG. 3 or that in FIG. 4 is selected in accordance with a type how a lighting apparatus is set.

Moire stripes will be considered according to RGB stripes shown in FIG. 3 and FIG. 4.

As shown in FIG. 3, when the direction of the RGB stripes in the liquid crystal element is parallel with the incident surface portion 32a of the light conductor 32, it is expected that moire stripes generate by line elements (1), (2), (3) and (4) in the pixel and by the string of prisms of the light conductor 32. It is assumed that a moire stripe formed by the line element (1) in the direction of the RGB stripes in the liquid crystal element and the string of prisms is set to a moire stripe X1. It is assumed that a moire stripe formed by the line element (2) perpendicular to the direction of the RGB stripes in the liquid crystal element and the string of prisms is set to a moire stripe X2. It is assumed that a moire stripe formed by the line element (3) which is a pixel diagonal line in the liquid crystal element and the string of prisms is set to a moire stripe X1. It is assumed that a moire stripe formed by the line element (4) in the direction of a 1/3 pixel diagonal line in the liquid crystal element and the string of prisms is set to a moire stripe X4.

By using the included angle α and a pitch of moire stripes, FIGS. 5, 6, 7 and 8 show situations of generating moire stripes when a repetition pitch of a string of prisms is varied for a pixel pitch (=3×a). The pixel pitch (3×a) of the liquid crystal panel used in an experiment is 0.2235 mm.

As shown in FIG. 5, when the repetition pitch of a string of prisms is equal to the pixel pitch, the moire stripe X1 includes two kinds of a moire stripe X1a and a moire stripe X1b. The pitch of the moire stripe X1a becomes infinite as the included angle α is close to 0°. The pitch of the moire stripe X1b varies slowly when the included angle α varies between 0° and 45°. In a condition in which a plurality of pitches of moire stripes are coincided, namely, at a intersection point in the graph, it is considered that moire stripes are not hard to be recognized. That was confirmed by a visual experiment. For example, in FIG. 5, the moire stripe X1b and the moire stripe X3 are intersected in the vicinity in which the included angle α is 30° and the moire pitch is 0.43 mm. Also, the moire stripe X3 and the moire stripe X4 are intersected in the vicinity in which the included angle α is 38° and the moire pitch is 0.44 mm. In the vicinity of these intersection points, it is hard to recognize the moire stripes. Also, it is hard to recognize the moire stripes as the moire pitch is small.

Figure 6:
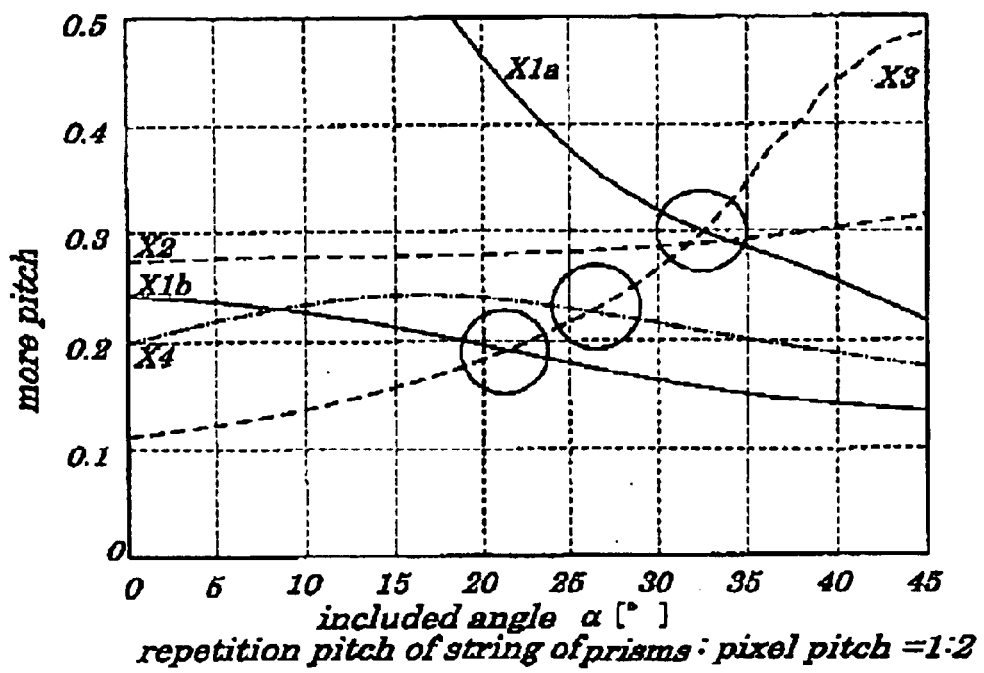
FIG. 6 is a graph showing a generation state of moire stripes.

As shown in FIG. 6, when a ratio of the repetition pitch of a string of prisms to the pixel pitch is 1:2, in an intersection point of the moire stripe X1 and the moire stripe X3, namely, in an area in which a moire pitch is larger than the vicinity of the included angle α of 32° and the moire pitch of 0.3 mm, a line in the graph does not appear until the line enters an area of the moire pitch of 0.2 mm or less. Therefore, it is understood that moire stripes are hard to be recognized when the included angle α is set to 32°. These intersection points are enclosed by circles □.

Figure 7:
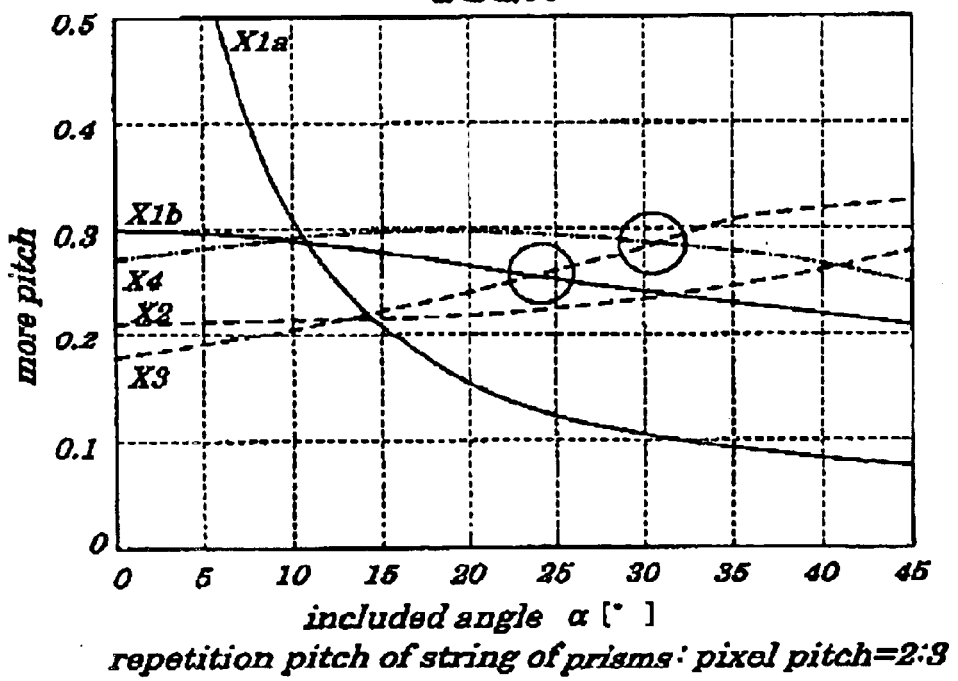
FIG. 7 is a graph showing a generation state of moire stripes.
Figure 8:
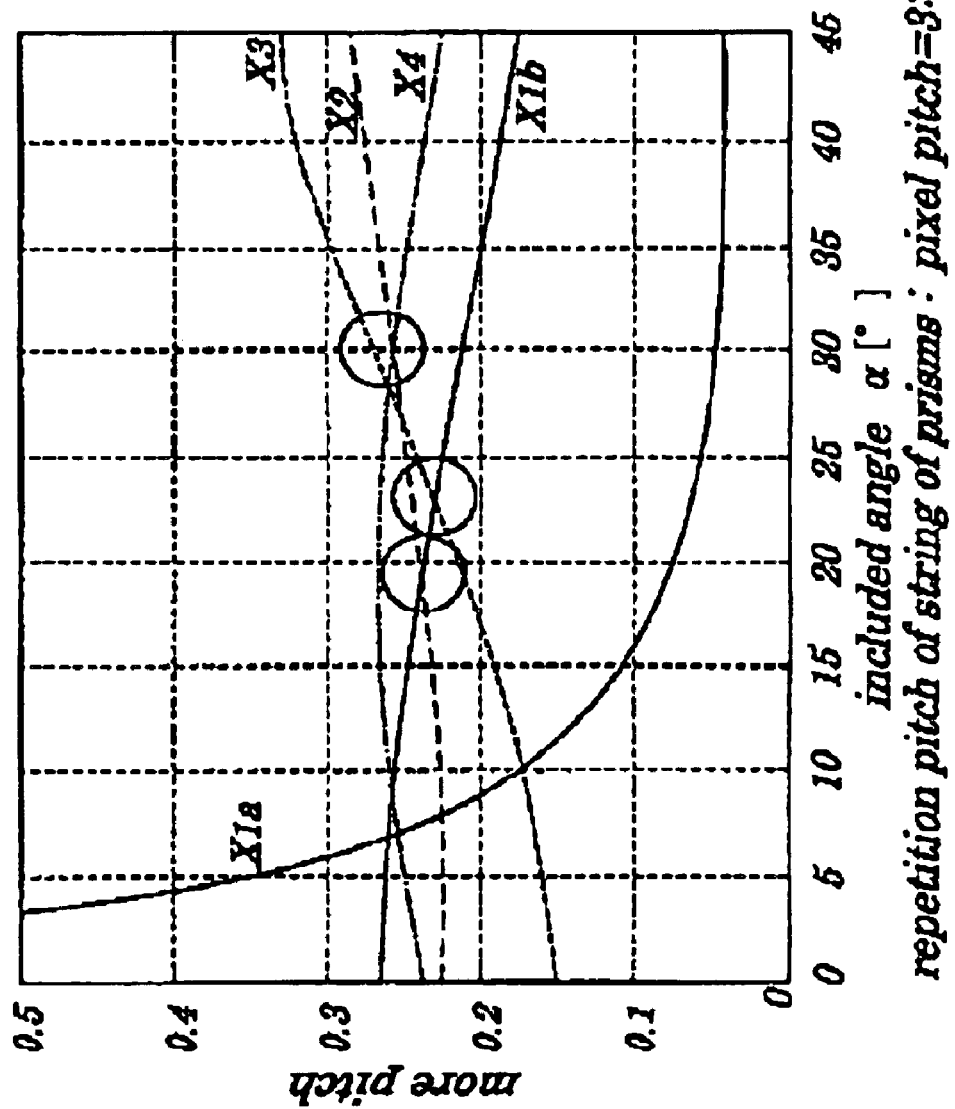
FIG. 8 is a graph showing a generation state of moire stripes.
Figure 9:
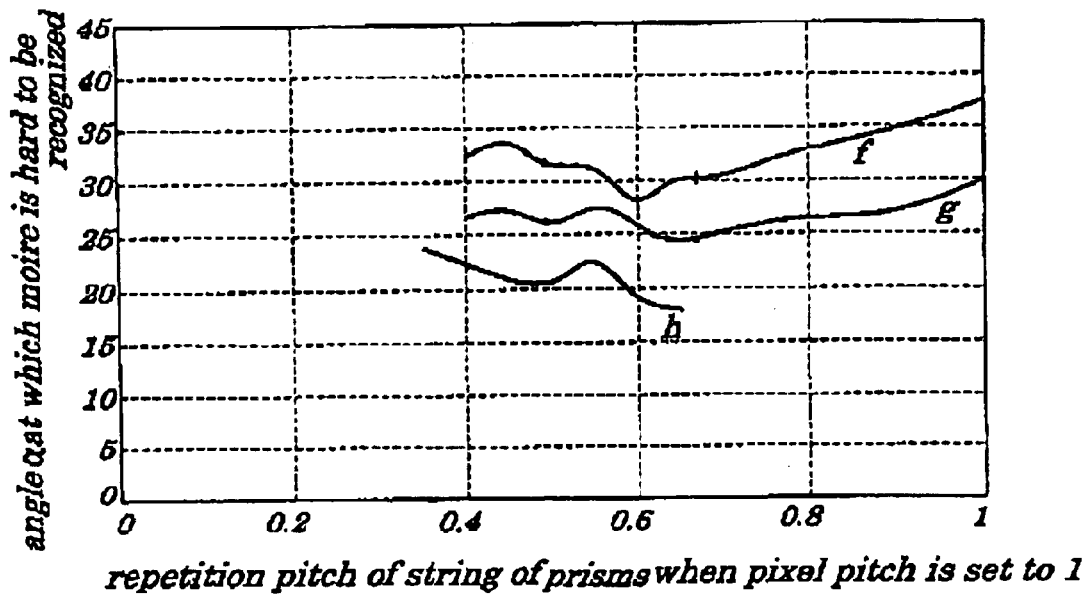
FIG. 9 is a graph showing intersection points in the graphs shown in FIG. 5 to FIG. 8.

FIG. 7 and FIG. 8 are respective graphs showing a case in that a ratio of the repetition pitch of a string of prisms to the pixel pitch is 2:3 and a case in that the ratio is 3:5. FIG. 9 is a view showing intersection points in FIGS. 5 to 8 when the repetition pitch of a string of prisms is set to a horizontal axis in a case of the pixel pitch of 1.

In FIG. 9, points are connected at which moire stripes are hard to be recognized and are enclosed by the circles in FIGS. 5 to 8. A vertical axis indicates an angle at which moire stripes are hard to be recognized and corresponds to the included angle α. In FIG. 9, considerations will be given to graphs in that the pixel pitch is set to 1 and a repetition pitch is 0.5. This case corresponds to FIG. 6. Concretely, an uppermost graph f in FIG. 9 corresponds to the intersection point of the moire stripe X1a and the moire stripe X3 in FIG. 6, a middle graph g in FIG. 9 corresponds to the intersection point of the moire stripe X3 and the moire stripe X4 in FIG. 6, and a lowest graph h in FIG. 9 corresponds to the intersection point of the moire stripe X1b and the moire stripe X3 in FIG. 6. No graph exists over the intersection point of the moire stripe X1a and the moire stripe X3 in FIG. 6, one graph exists over the intersection point of the moire stripe X3 and the moire stripe X4, and two graphs exist over the intersection point of the moire stripe X1b and the moire stripe X3.

Further, in FIG. 9, considerations will be given to graphs in that the pixel pitch is set to 1 and a repetition pitch is 0.67. This case corresponds to FIG. 7. Concretely, an uppermost graph f in FIG. 9 corresponds to the intersection point of the moire stripe X3 and the moire stripe X4 in FIG. 7, and a middle graph g in FIG. 9 corresponds to the intersection point of the moire stripe X1b and the moire stripe X3 in FIG. 7. No graph exists over the intersection point of the moire stripe X3 and the moire stripe X4 in FIG. 7, and one graph exists over the intersection point of the moire stripe X3 and the moire stripe X4. Therefore, in FIG. 9, it tends that moire stripes are hard to be recognized as the included angle α becomes large.

The above considerations are given only to the included angle α, however, the included angle β also will make same results. On the basis of these considerations and the visual experiments, ranges of the included angle α and the included angle β so that moire stripes are hard to be recognized in FIG. 9 is, $$20° \leq \alpha \leq 35° \text{ and } 20° \leq \beta \leq 35°,$$

preferably, a range of small moire pitch is, $$25° \leq \alpha \leq 35° \text{ and } 25° \leq \beta \leq 35°.$$

Next, as shown in FIG. 4, when the direction of RGB stripes in the liquid crystal element is perpendicular to the incident surface portion 32a of the light conductor 32, it is expected that morie stripes formed by line elements (1), (2), (3) and (4) and the string of prisms of the light conductor 32 generate. A moire stripe formed by the line element (1) perpendicular to the RGB stripe of the liquid crystal element and the string of prisms is called a moire stripe X1. A moire stripe formed by the line element (2) in a same direction of the RGB stripe of the liquid crystal element and the string of prisms is called a moire stripe X2. A moire stripe formed by the line element (3) of a pixel diagonal line of the liquid crystal element and the string of prisms is called a moire stripe X3. A moire stripe formed by the line element (4) in a direction of 1/3 pixel diagonal line and the string of prisms is called a moire stripe X4.

By using the included angle α and the moire pitches, FIGS. 10, 11, 12 and 13 show generation situations of moire stripes when the repetition pitch of a string of prisms is varied for a pixel pitch (=3×a). The pixel pitch (3×a) of the liquid crystal panel used for experiments is 0.2235 mm.

Figure 10:
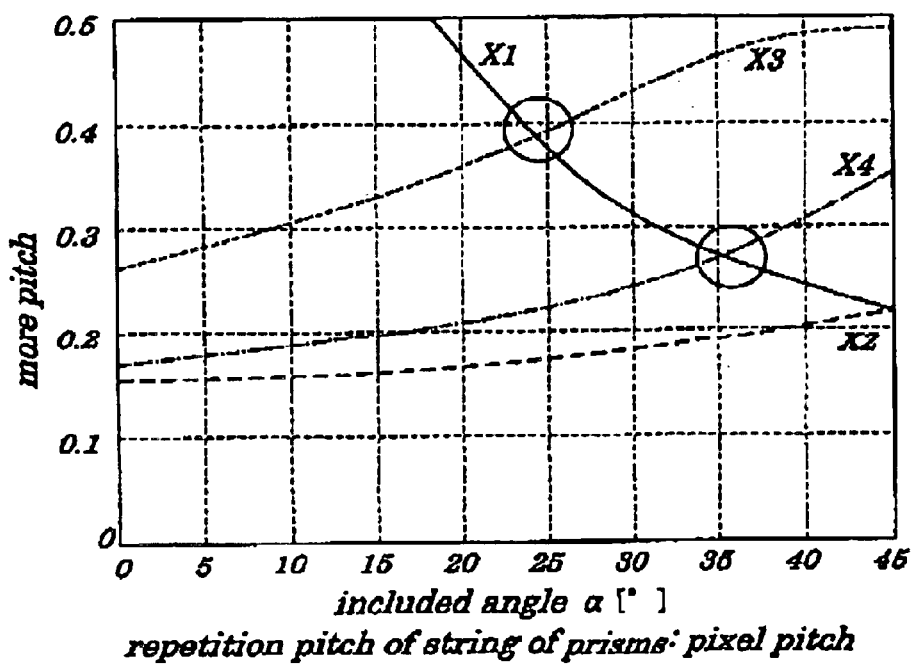
FIG. 10 is a graph showing a generation state of moire stripes.

As shown in FIG. 10, when the repetition pitch of a string of prisms is equal to the pixel pitch, the pitch of the moire stripe X1 becomes infinite as the included angle α is close to 0°. Concerning the moire stripes X2, X3 and X4, pitches becomes larger as the included angle α becomes larger. In a condition in which a plurality of pitches of moire stripes are coincided, moire stripes are hard to be recognized. For example, in FIG. 10, the moire stripe X1 and the moire stripe X3 are intersected in the vicinity in which the included angle α is 24° and the moire pitch is 0.35 mm. Also, the moire stripe X1 and the moire stripe X4 are intersected in the vicinity in which the included angle α is 35° and the moire pitch is 0.28 mm. In the vicinity of these intersection points, it is hard to recognize the moire stripes. Also, it is hard to recognize the moire stripes as the moire pitch is small.

Figure 12:
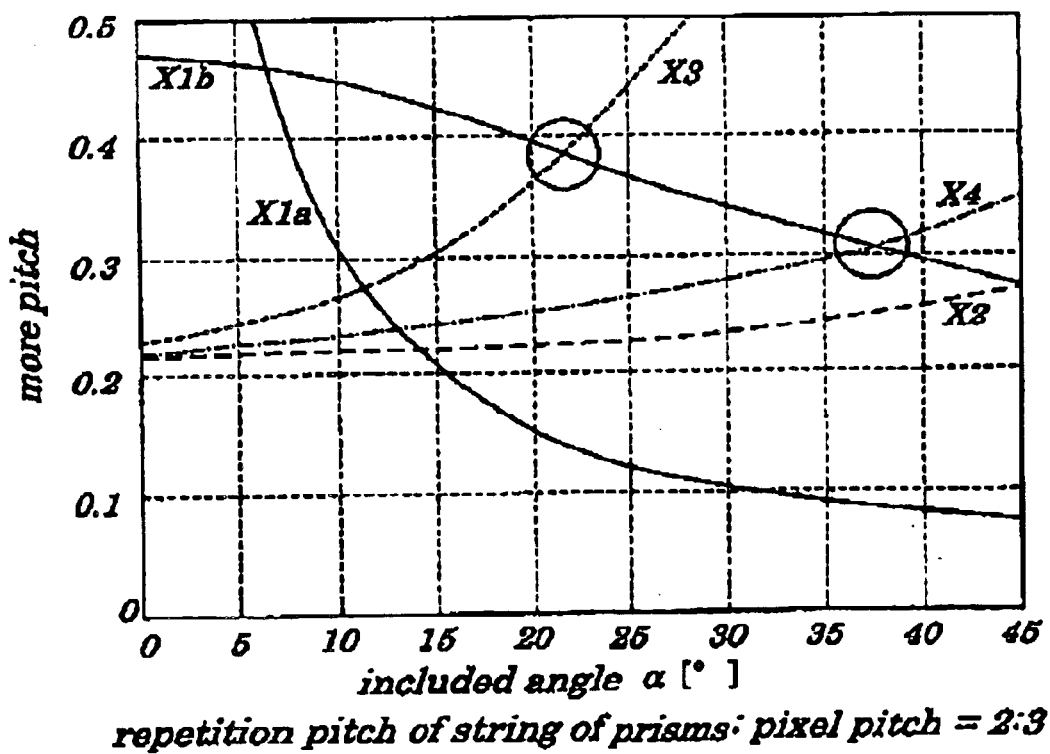
FIG. 12 is a graph showing a generation state of moire stripes.

As shown in FIG. 12, when a ratio of the repetition pitch of a string of prisms to the pixel pitch is 2:3, in an intersection point of the moire stripe X1b and the moire stripe X3, namely, in an area in which a moire pitch is larger than the vicinity of the included angle α of 22° and the moire pitch of 0.38 mm, no line exists. In an area of which the moire pitch is shorter than this condition, a line in the graph does not appear until the line enters an area of the moire pitch of 0.25 mm or less. Therefore, it is understood that moire stripes are hard to be recognized when the included angle α is set to 22°. These intersection points are enclosed by circles □.

Figure 11:
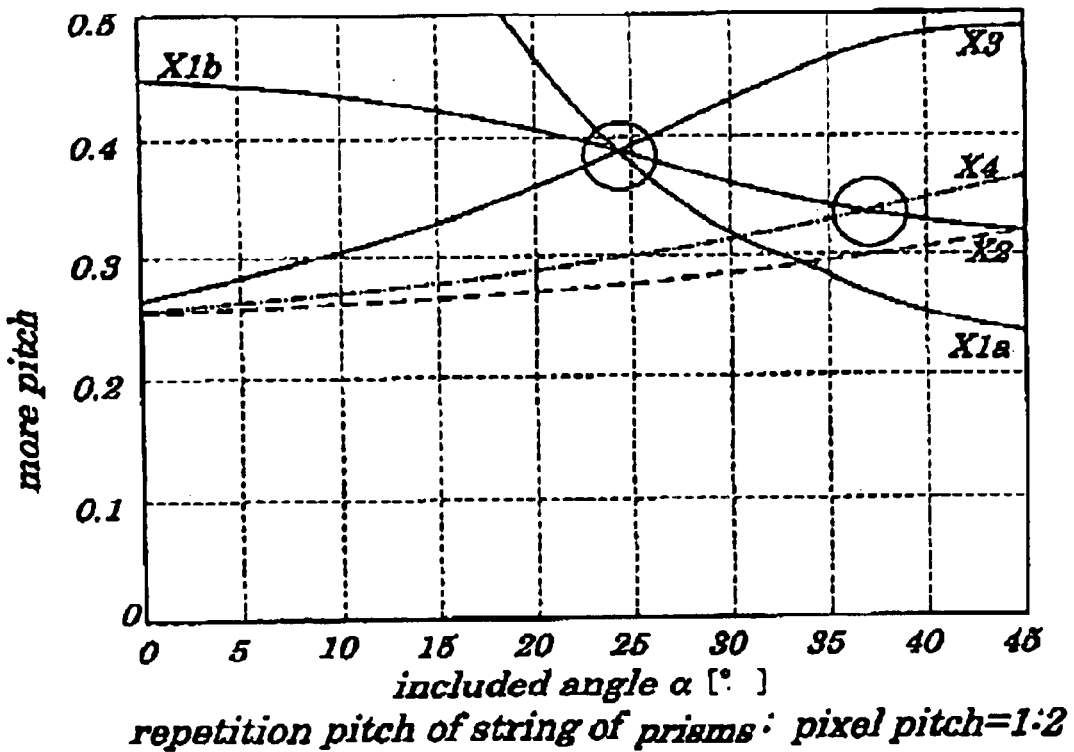
FIG. 11 is a graph showing a generation state of moire stripes.
Figure 13:
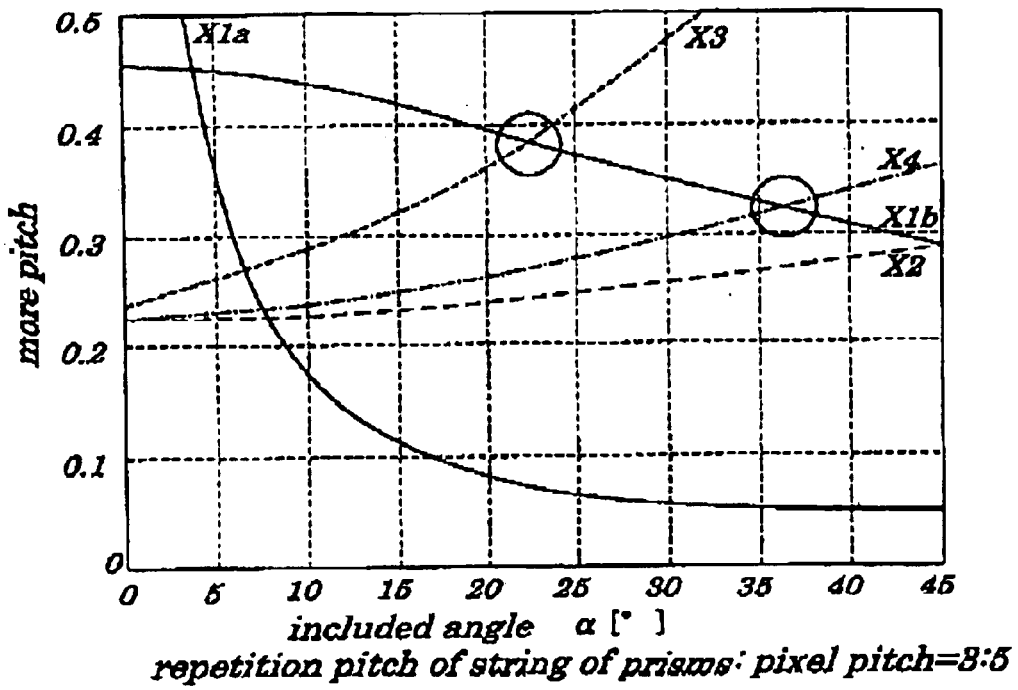
FIG. 13 is a graph showing a generation state of moire stripes.

FIG. 11 and FIG. 13 are respective graphs showing a case in that a ratio of the repetition pitch of a string of prisms to the pixel pitch is 1:2 and a case in that the ratio is 3:5.

Figure 14:
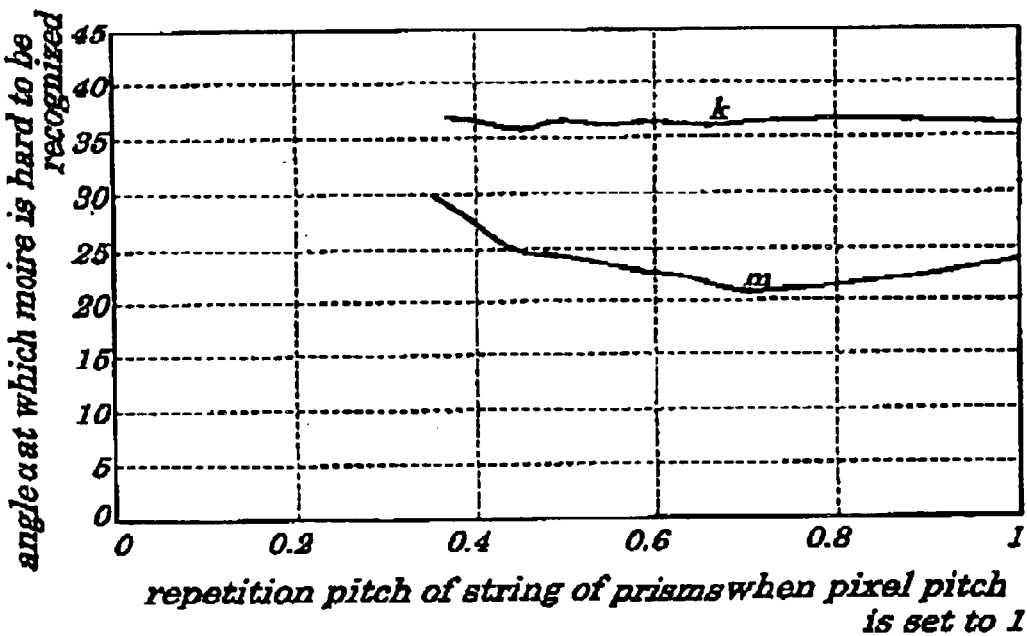
FIG. 14 is a graph showing intersection points in the graphs shown in FIG. 10 to FIG. 13.

FIG. 14 is a view showing intersection points in FIGS. 10 to 13 when the repetition pitch of a string of prisms is set to a horizontal axis in a case of the pixel pitch of 1.

In FIG. 14, points at which moire stripes are hard to be recognized and are enclosed by the circles in FIGS. 10 to 13. A vertical axis indicates an angle at which moire stripes are hard to be recognized and corresponds to the included angle α. In FIG. 14, considerations will be given to graphs in that the pixel pitch is set to 1 and a repetition pitch is 0.5. This case corresponds to FIG. 11. Concretely, a second graph m in FIG. 14 corresponds to the intersection point of the moire stripe X1b and the moire stripe X4 in FIG. 11, and a first graph k in FIG. 14 corresponds to the intersection point of the moire stripe X1a and the moire stripe X3 in FIG. 11. No graph exists over the intersection point of the moire stripe X1b and the moire stripe X4 in FIG. 11, and one graph exists over the intersection point of the moire stripe X1b and the moire stripe X4.

Further, in FIG. 14, considerations will be given to graphs in that the pixel pitch is set to 1 and a repetition pitch is 0.67. This case corresponds to FIG. 12. Concretely, a first graph k in FIG. 14 corresponds to the intersection point of the moire stripe X1b and the moire stripe X4 in FIG. 12, and a second graph m in FIG. 14 corresponds to the intersection point of the moire stripe X1b and the moire stripe X3 in FIG. 12. No graph exists over the intersection point of the moire stripe X1b and the moire stripe X4 in FIG. 12, and no graph exists over the intersection point of the moire stripe X1b and the moire stripe X4. However, a graph exists under the intersection point of the moire stripe X1b and the moire stripe X4 in the vicinity of the morie pitch of 0.25 mm, and a graph exists over the intersection point of the moire stripe X1b and the moire stripe X3 in the vicinity of the morie pitch of 0.22 mm. Therefore, in FIG. 14, it tends that moire stripes are hard to be recognized as the included angle α becomes small.

The above considerations are given only to the included angle α, however, the included angle β also will make same results. On the basis of these considerations and the visual experiments, ranges of the included angle α and the included angle β so that moire stripes are hard to be recognized in FIG. 14 is, $$20° \leq \alpha \leq 38° \text{ and } 20° \leq \beta \leq 38°.$$

preferably, a range of small moire pitch is, $$20° \leq \alpha \leq 30° \text{ and } 20° \leq \beta \leq 30°.$$

Further, the repetition pitch of a string of prisms in the light conductor 32 is limited to 0.05 mm or more in the present manufacturing technique, and it is siad that a pixel pitch of a PDA or a like to which the lighting apparatus 30 of the first embodiment is attached is 0.20 mm as a visible range excusably. Therefore, when the pixel pitch is set to 1, it is necessary to set 0.4 or more as the repetition pitch of a string of prisms in the light conductor 32. Also, when the pixel pitch is larger than the repetition pitch of a string of prisms, luminance evenness becomes conspicuous. Then, when the pixel pitch is set to 1, it is necessary to set 1 or less as the repetition pitch of a string of prisms in the light conductor 32. Further, the light efficiency is higher as the included angle α is smaller.

With the above considerations, when the pixel pitch is set to 3×a the repetition pitch P of a string of prisms so that moire stripes are hard to be recognized in FIG. 9 and FIG. 14 is, $$0.4 \times 3 \times a \leq P \leq 1 \times 3 \times a,$$

preferably, a range of small moire pitch is, $$0.5 \times 3 \times a \leq P \leq 0.8 \times 3 \times a.$$

Figure 15:
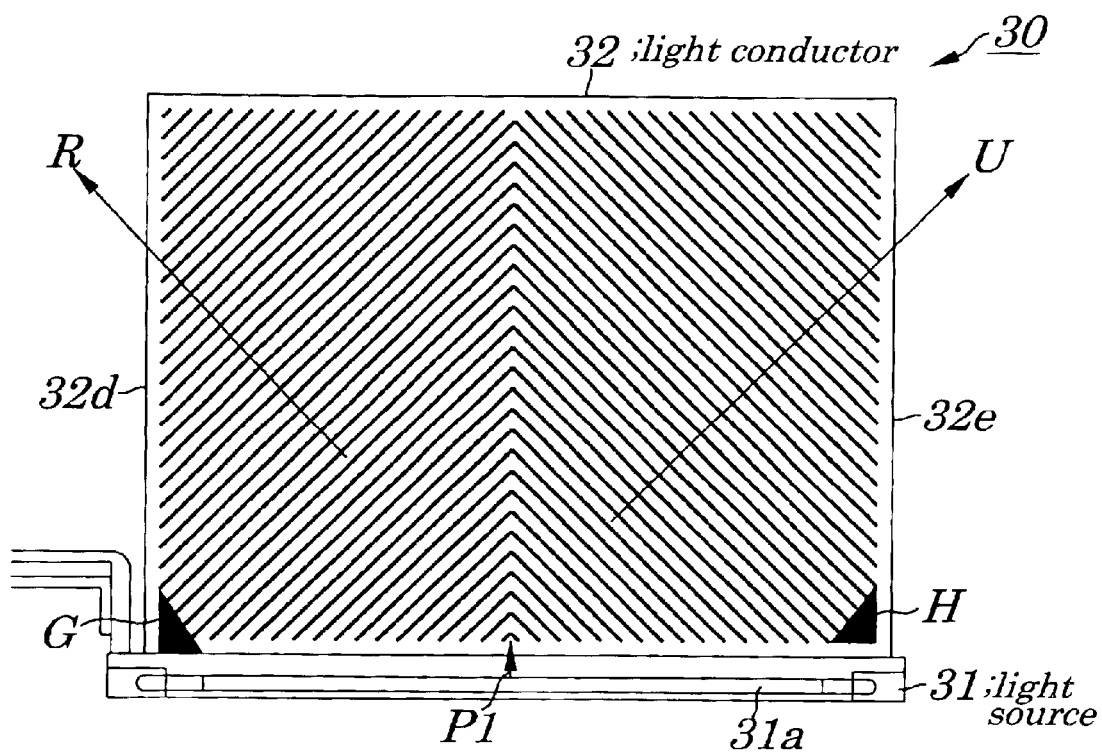
FIG. 15 is a view showing a lighting apparatus 30 indicated by an arrow A when a fluorescent lamp 31a in FIG. 2 is emitting.
Figure 16:
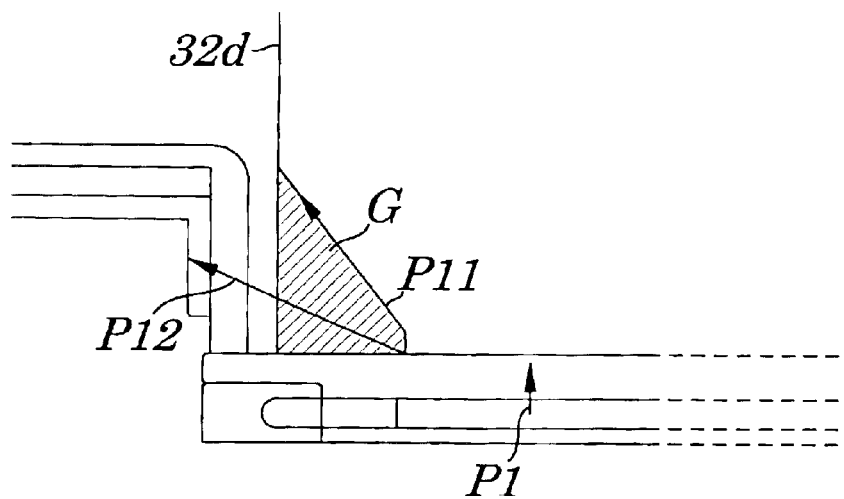
FIG. 16 is a detailed view showing a dark portion G in FIG. 15.

FIG. 15 is a view showing the lighting apparatus 30 indicated by the arrow A when the fluorescent lamp 31a in FIG. 2 is emitting. FIG. 16 is a detailed view showing the dark portion in FIG. 15.

As shown in FIG. 15, the light P1 is input to the incident surface portion 32a from the fluorescent lamp 31a and propagates in the light conductor 32. In this case, since the length Z of the emission portion of the fluorescent lamp 31a is shorter than the length of the incident surface portion 32a, there are areas in which the light P1 propagates in the light conductor 32 and the dark portions G and H generate in the repetition direction of a string of prisms.

In other words, as shown in FIG. 15, since most of the light P1 of the fluorescent lamp 31a propagates in inclination directions R and U of a string of prisms, dispersion light P11 of the light P1 propagates in the repetition direction R and dispersion light P12 transmits through the one end surface 32d. As a result, the dark portion G generates at a corner contact with the incident surface portion 32a and the one end surface 32d of the light conductor 32. Similarly, the dark portion H generates at a corner contact with the incident surface portion 32a and the another end surface 32e. Since these dark portions G and H generate out of the display area of the liquid crystal panel 40, there is no influence to a display quality and there is no problem.

As described above, according to the first embodiment, since the repetition directions of a string of prisms are set to the inclination directions R and U, it is possible to avoid generation of moire stripes, and the dark portions G and H generate out of the display area. Therefore, in the liquid crystal display in which a frame is made small, the display quality is improved. Further, as measures to prevent moire stripes, considerations in the repetition direction of a string of prisms are given to the RGB cell unit and to two cases including that the direction of RGB stripes and the incident surface portion 32a are parallel and perpendicular, and therefore, it is possible to prevent moire stripes from generating with reliability.

Second Embodiment

Figure 17:
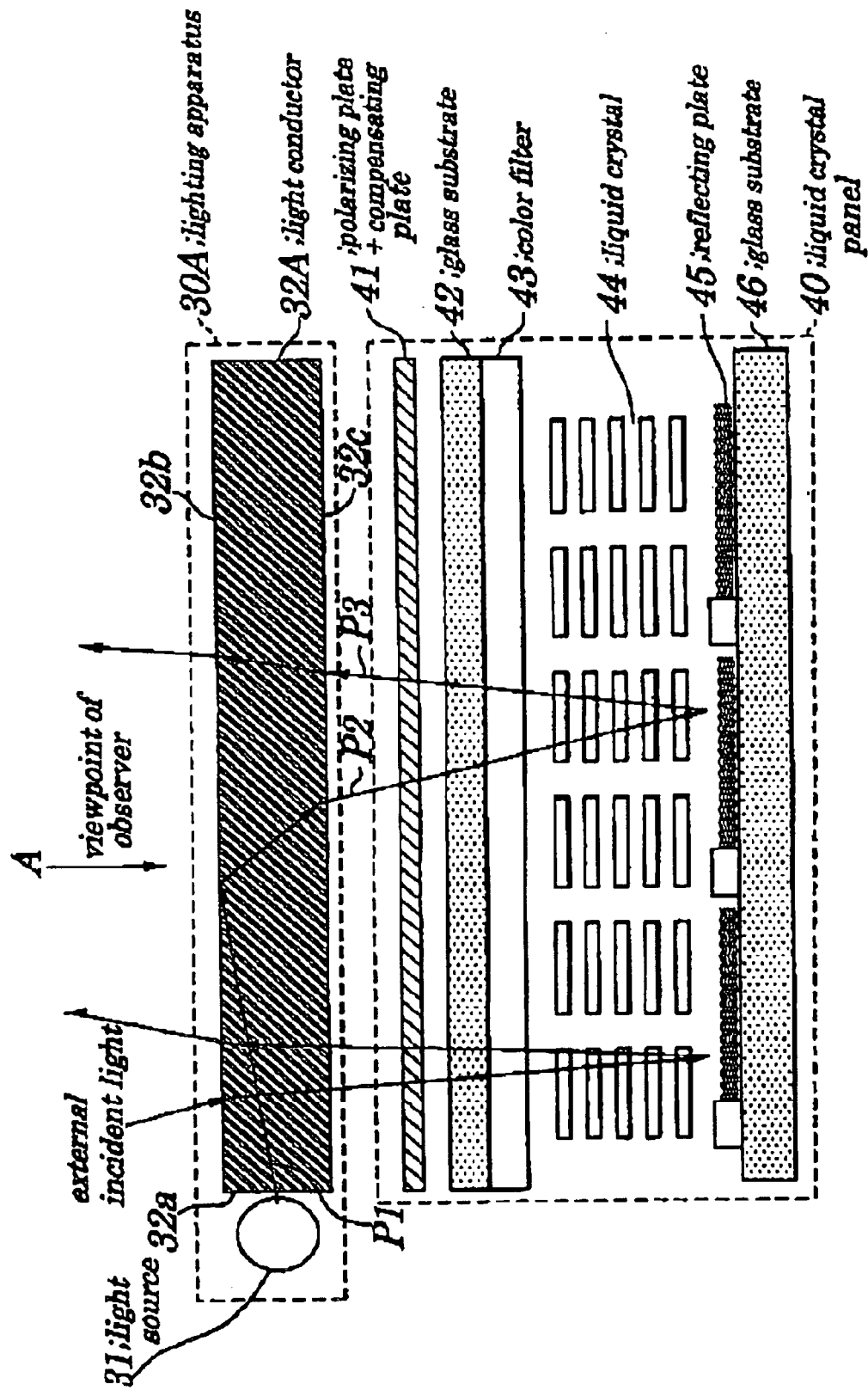
FIG. 17 is a structural view showing a liquid crystal display according a second embodiment of the present invention.

FIG. 17 is a structural view showing a liquid crystal display according to a second embodiment of the present invention, and the same numerals are applied to the same elements of the first embodiment shown in FIG. 1.

In the liquid crystal display according to the second embodiment, as shown in FIG. 17, a lighting apparatus 30A having a different structure instead of the lighting apparatus 30 in FIG. 1. The lighting apparatus 30A is provided with a light conductor 32A having different repetition direction of a string of prisms instead of the light conductor 32 in FIG. 1. Other elements are similar to those in FIG. 1.

Figure 18:
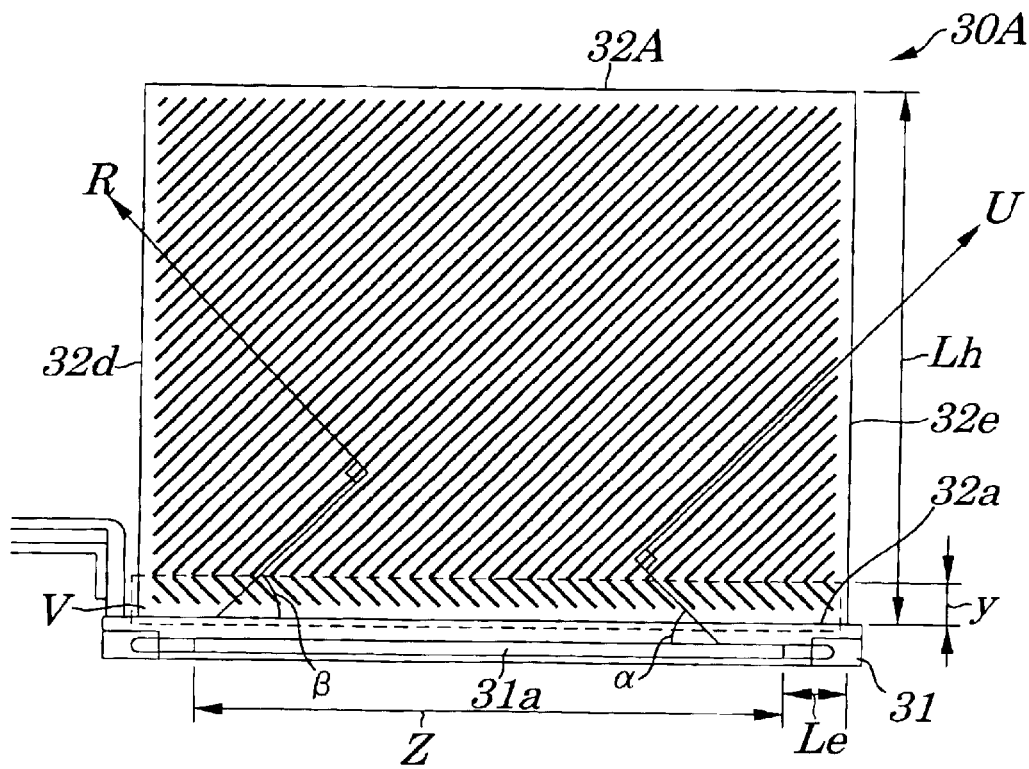
FIG. 18 is a view showing a lighting apparatus 30A indicated by an arrow A in FIG. 17.

FIG. 18 is a view showing the light apparatus 30A indicated by the arrow A, and the same numerals are applied to the same elements of the first embodiment shown in FIG. 2.

In the lighting apparatus 30A, as shown in FIG. 18, in a predetermined area (such as an area V) contact with the incident surface portion 32a and with another end surface 32e adjacent to the incident surface portion 32a, the repetition direction of a string of prisms is set to a first inclination direction U inclining in a direction from the incident surface portion 32a to the another end surface 32e, and in an area except the area V, the repetition direction is set to a second inclination direction R inclining in a direction from the incident surface portion 32a to the one end surface 32d. The area V is an area from the incident surface portion 32a to a position of a distance y. The y is set as follows:

$$Lh \geq y \geq Le/\tan \alpha,$$

where Lh is a length of the another end surface 32e, Le is a distance of non-emission portion of the fluorescent lamp 31a from the another end surface 32e and α is an included angle between n a vertical direction of the inclination direction U and the incident surface portion 32a.

In FIG. 18, on a border line of the area U and the area V, outgoing directions of light are different, and therefore, it is impossible to prevent height differences between propagation portions and reflection portions of a string of prisms from generating. As a result, light discontinuities occur at the differences, and bright lines and dark lines are recognized. Therefore, the distance y is set so that the area V corresponds to an area out of the display screen of the liquid crystal panel 40. Further, similarly to the first embodiment, on the basis of the characteristic views of FIG. 9 and FIG. 14, the included angle a between the vertical direction of the inclination direction U and the incident surface portion 32a and the included angle β between the vertical direction of the inclination direction R and the incident surface portion 32a are set as follows:

$$20° \leq \alpha \leq 35° \text{ and } 20° \leq \beta \leq 35°.$$

Figure 19:
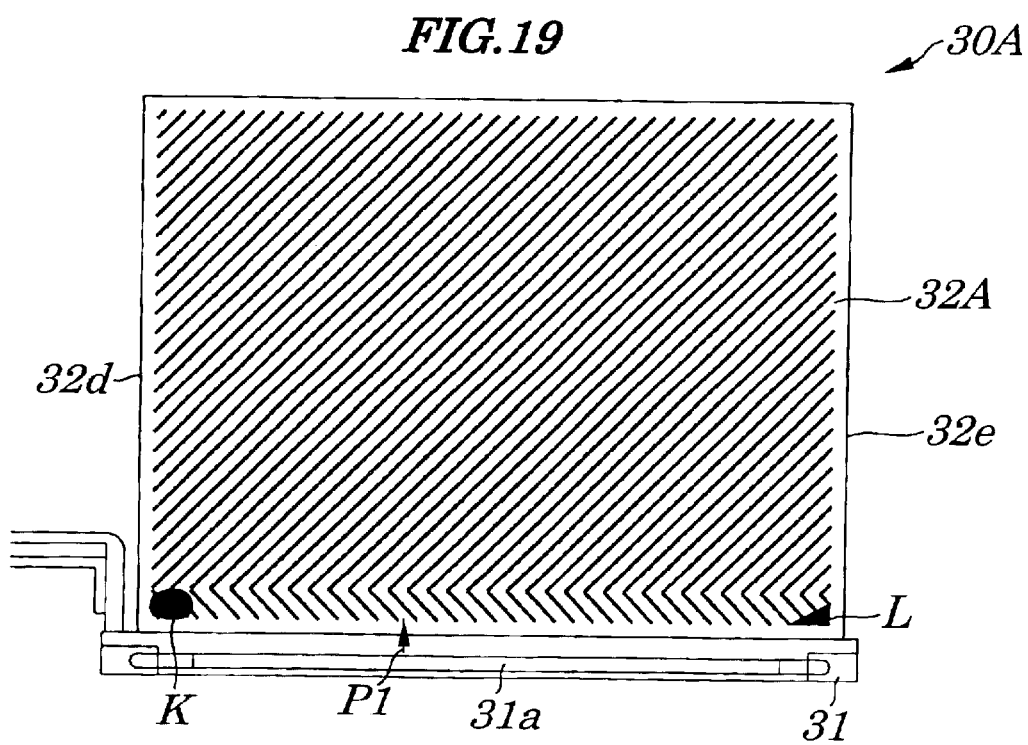
FIG. 19 is a view showing a lighting apparatus 30A indicated by an arrow A when a fluorescent lamp 31a in FIG. 18 is emitting.
Figure 20:
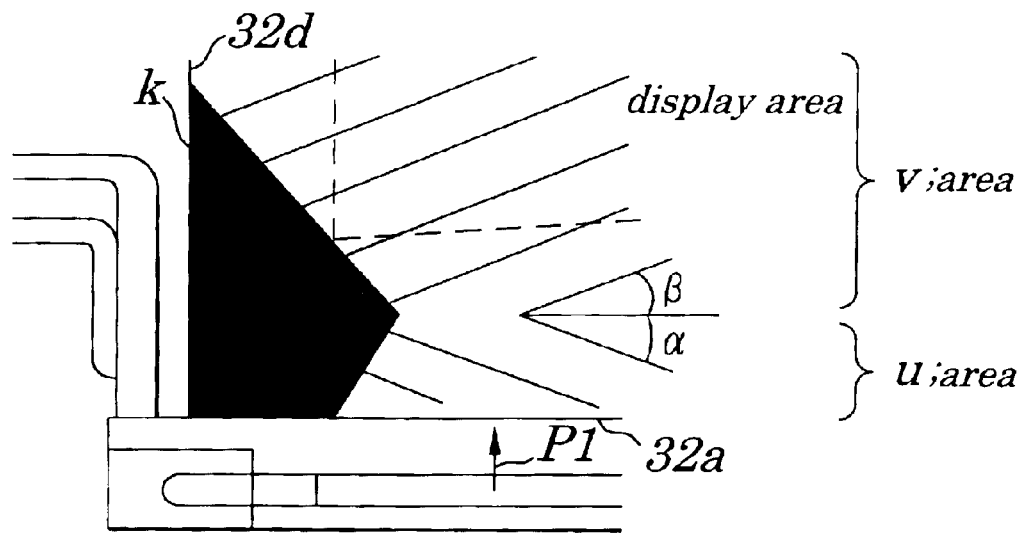
FIG. 20 is a detailed view showing a dark portion K in FIG. 19.

FIG. 19 is a view showing the light apparatus 30A indicated by the arrow A when the fluorescent lamp 31a in FIG. 18 is emitted. FIG. 20 is a detailed view showing a dark portion K and a dark portion L in FIG. 19.

As shown in FIG. 19, the light P1 is input into the incident surface portion 32a from the fluorescent lamp 31a and is propagated in the light conductor 32A. In this case, since the length Z of the emission portion of the fluorescent lamp 31a is shorter than the length of the incident surface portion 32a, there are areas to which no light is propagated and the dark portions K and L and a dark line M are generated in the repetition direction of the string of prisms.

Figure 21:
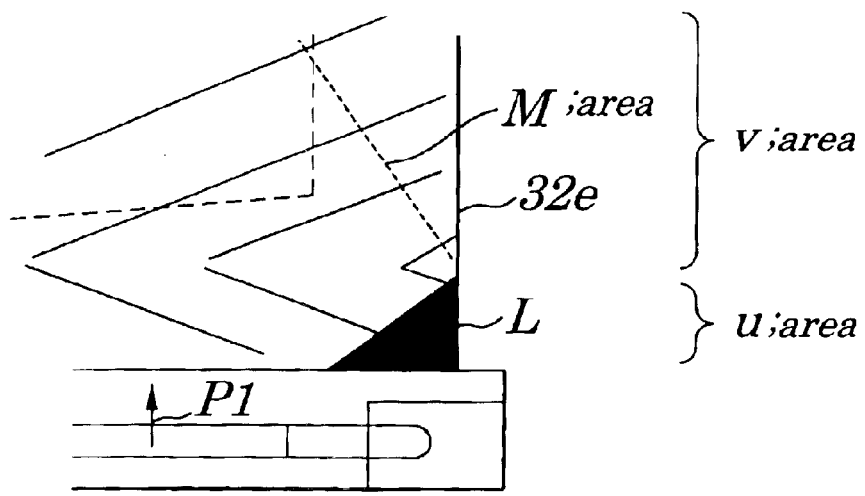
FIG. 21 is a detailed view showing a dark portion L in FIG. 19.

In other words, as shown in FIG. 20, since the dark portion K generates in an area u at a corner contact with the incident surface portion 32a and the one end surface 32d of the light conductor 32, and then a direction is changed in an area v, the dark portion generates in the area u out of the display area of the liquid crystal panel 40. Further, as shown in FIG. 21, the dark portion L generates in the area u at a corner contact with the incident surface portion 32a and the end surface 32c, and the dark line M is minimized in the area v by changing a path of the light P1 in the area u.

Therefore, there is no influence to a display quality.

As described above, according to the second embodiment, the repetition directions of a string of prisms are set to the inclination directions R and U, similarly to the first embodiment, generation of moire stripes is avoided and the dark portions G and H generate out of the display area. Therefore, in the liquid crystal display in which a frame is made small, the display quality is improved.

Third Embodiment

Figure 22:
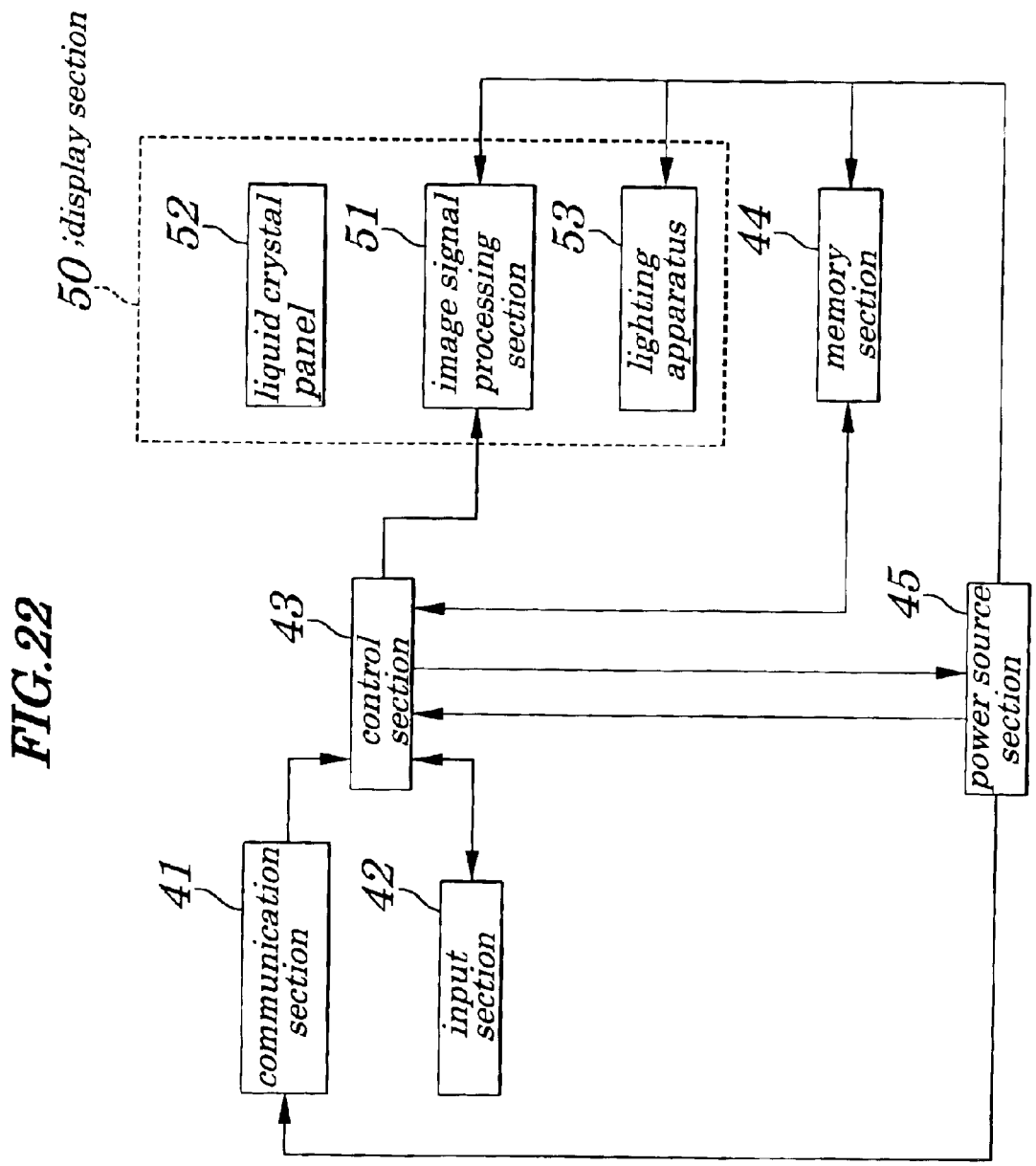
FIG. 22 is a block diagram showing an electrical structure of an electronic apparatus according to a third embodiment of the present invention.
Figure 23:
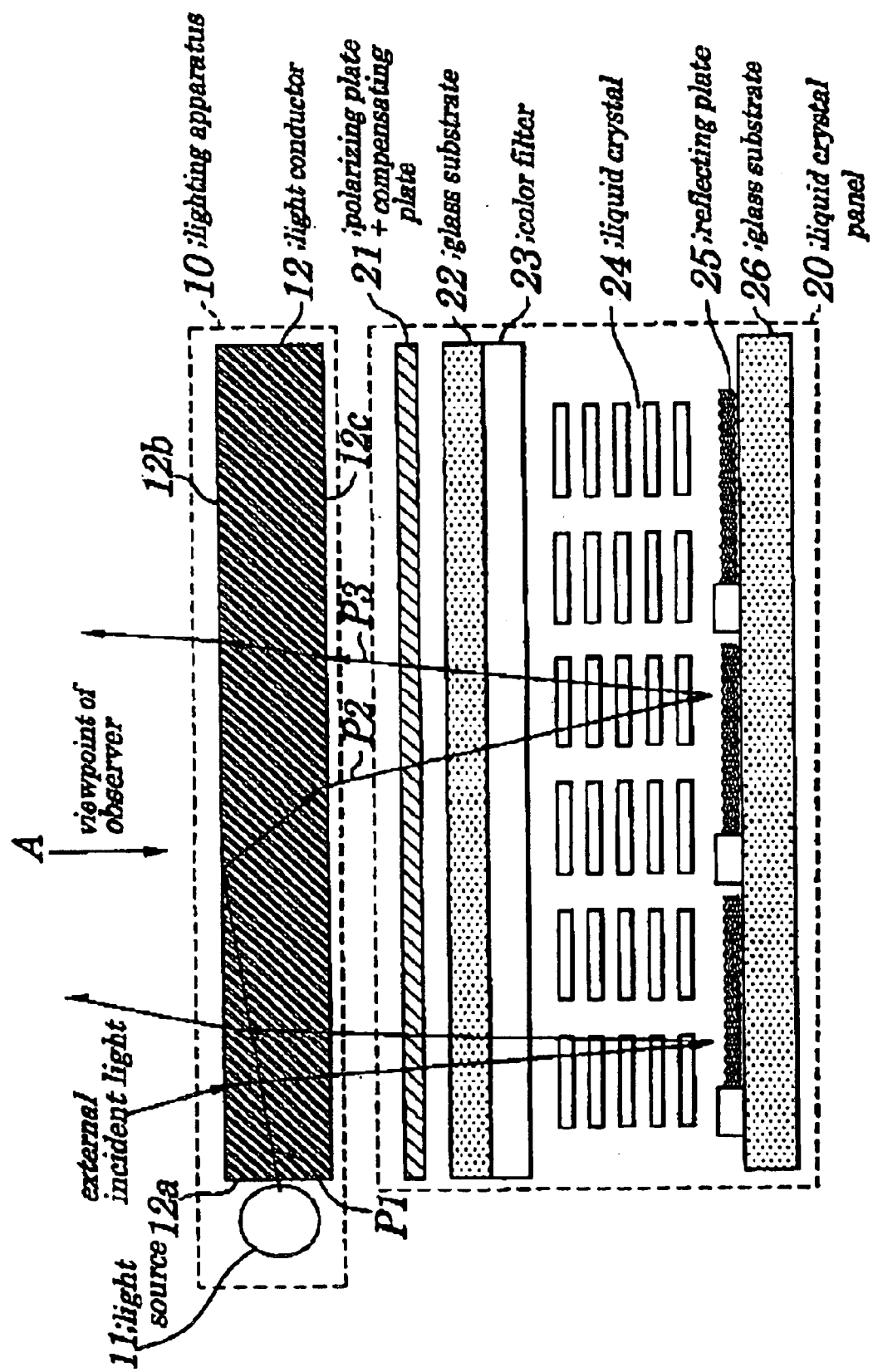
FIG. 23 is a structural view showing a conventional liquid crystal display.

FIG. 22 is a block diagram showing an electrical structure of an electronic apparatus according to a third embodiment of the present invention.

The electronic apparatus according to the third embodiment, as shown in FIG. 22, is a PDA and is provided with a communication section 41, an input section 42, a control section 43, a memory section 44, a power source section 45 and a display section 50. The communication section 41 performs data-communication with a radio base station not shown. The input section 42 is a keyboard or a like and receives a signal necessary for an operation in accordance with an user's operation.

The control section 43 controls the PDA as whole. The memory section 44 memorizes control program for operating the control section 43 and memorizes various data used for the data-communication. The power source section 45 supplies power to all elements of the PDA. The display section 50 is provided with an image signal processing section 51, a liquid crystal panel 52 and a lighting apparatus 53 and a frame is made small. The image signal processing section 51 converts various data sent from the control section 43 into display data. The a liquid crystal panel 52 is a reflection type similarly to the liquid crystal panel 40 and displays the display data sent from the image signal processing section 51. The lighting apparatus 53 is similar to the lighting apparatus 30 in FIG. 1 or the lighting apparatus 30A in FIG. 7 and supplies the light to the liquid crystal panel 52.

In the PDA, the liquid crystal panel 52 is illuminated by the lighting apparatus 53, and the display data is displayed. At this time, in the display area of the display panel 52, no moire stripe and no dark portion generate.

As described above, according to the third embodiment, the lighting apparatus 53 is similar to the lighting apparatus 30 or the lighting apparatus 30A. Therefore, though the display section 50 is made small, no moire stripe and no dark portion generate. As a result, the display quality is improved.

It is apparent that the present invention is not limited to the above embodiments but may be changed and modified without departing from the scope and spirit of the invention.

For example, in FIG. 2 showing the first embodiment, a distance x from the another end surface 32e is set out of the display area at a side of the another end surface 32e, whereby the area Q may include all of the display area Q. Also, in FIG. 18 showing the second embodiment, each repetition direction of a string of prisms in the area V and the area out of the area V may be reverse. Further, the area V is only contact with the incident surface portion 32a and the another end surface 32e, and the area V may be not contact with the one end surface 32d. The light source 31 may be a line light source in which point light sources such as LED and EL are arranged by a reflector. The electronic apparatus according to the third embodiment is not limited to the PDA, and any electronic apparatus is available only if it is provided with a small display section.

What is claimed is:

1. A light conductor comprising:
an incident surface portion,
a prism surface portion, and
an outgoing surface portion, wherein when light is input from an external source via said incident surface portion, said light reflects on said prism surface portion as a first reflected light, said prism surface portion outputs said first reflected light to an object through said outgoing surface portion, said outgoing surface portion receives a second reflected light that is reflected off said object and outputs said second reflected light to a viewpoint of an observer through the prism surface portion,
wherein said prism surface portion comprises first and second strings of linear prisms that are regularly repeatedly formed in parallel to each other, said linear prisms having propagation portions for propagating said light from said external source and reflection portions for reflecting said light,
wherein a first repetition direction of said first string of linear prisms, in a predetermined area in contact with said incident surface portion and in contact with a first end surface adjacent to said incident surface portion, is set in a first inclination direction inclining from said incident surface portion to said first end surface, and
wherein a second repetition direction of said second string of linear prisms, in an area other than said predetermined area, is set in a second inclination direction inclining from said incident surface portion to a second end surface opposite to said first end surface.

2. The light conductor according claim 1, wherein an included angle $\alpha$ between a vertical direction of said first inclination direction and said incident surface portion and an included angle $\beta$ between a vertical direction of said second inclination direction and said incident surface portion are set as follows:

$$20° \leq \alpha \leq 35° \text{ and } 20° \leq \beta \leq 35°.$$

3. The light conductor according claim 1, wherein on a border between said predetermined area and said area other than said predetermined area, a height of said prism surface portion in said predetermined area is equal to a height of said prism surface portion in said area other than said predetermined area.

4. A lighting apparatus comprising:
a light source, and
a light conductor,
wherein said light conductor comprises:
an incident surface portion,
a prism surface portion, and
an outgoing surface portion, wherein when light is input from said light source via said incident surface portion, said light reflects on said prism surface portion as a first reflected light, said prism surface portion outputs said first reflected light to an object through said outgoing surface portion, said outgoing surface portion receives a second reflected light that is reflected off said object and outputs said second reflected light to a viewpoint of an observer through the prism surface portion,
wherein said prism surface portion comprises first and second strings of linear prisms that are regularly repeatedly formed in parallel to each other, said linear prisms having propagation portions for propagating said light from said external source and reflection portions for reflecting said light,
wherein a first repetition direction of said first string of linear prisms, in a predetermined area in contact with said incident surface portion and in contact with a first end surface adjacent to said incident surface portion, is set in a first inclination direction inclining from said incident surface portion to said first end surface, and
wherein a second repetition direction of said second string of linear prisms, in an area other than said predetermined area, is set in a second inclination direction inclining from said incident surface portion to a second end surface opposite to said first end surface.

5. The lighting apparatus according to claim 4, wherein an included angle $\alpha$ between a vertical direction of said first inclination direction and said incident surface portion and an included angle $\beta$ between a vertical direction of said second inclination direction and said incident surface portion are set as follows:

$$20° \leq \alpha \leq 35° \text{ and } 20° \leq \beta \leq 35°.$$

6. A lighting apparatus comprising:
a light source having an emission portion of a predetermined length and a light conductor, said light conductor comprising:
an incident surface portion which is longer than said emission portion of said light source,
a prism surface portion, and
an outgoing surface portion, wherein when light is supplied from a light source via said incident surface portion, said light reflects on said prism surface portion as a first reflected light said prism surface portion outputs, said first reflected light to an object through said outgoing surface portion, said outgoing surface portion receives a second reflected light reflected off said object and outputs said second reflected light to a viewpoint of an observer through said prism surface portion,
wherein said prism surface portion comprises first and second strings of linear prisms that are regularly repeatedly formed in parallel to each other, said linear prisms having propagation portions for propagating said light from said external source and reflection portions for reflecting said light,
wherein a first repetition direction of said first string of linear prisms, in a predetermined area in contact with said incident surface portion and in contact with a first end surface adjacent to said incident surface portion, is set in a first inclination direction inclining from said incident surface portion to said first end surface, and
wherein a second repetition direction of said second string of linear prisms, in an area other than said predetemined area, is set in a second inclination direction inclining from said incident surface portion to a second end surface opposite to said first end surface.

7. The lighting apparatus according to claim 6, wherein an included angle $\alpha$ between a vertial direction of said first inclination direction and said incident surface portion and an included angle $\beta$ between a vertical direction of said second inclination direction and said incident surface portion are set as follows:

$$20° \leq \alpha \leq 35° \text{ and } 20° \leq \beta \leq 35°.$$

8. A liquid crystal display comprising:
a light source;
a light conductor comprising:
an incident surface portion;
a prism surface portion; and
an outgoing surface portion,
wherein when light is supplied from a light source via said incident surface portion, said light reflects on said prism surface portion as a first reflected light and said prism surface portion outputs said first reflected light through said outgoing surface portion to an object, said outgoing surface portion receives a second reflected light reflected from said object and outputs said second reflected light to a viewpoint of an observer through said prism surface portion; and wherein said liquid crystal display further comprises a liquid crystal panel that receives said first reflected light from said outgoing surface portion and for performing display screen control so as to reflect light as said second reflected light to said light conductor, wherein said prism surface portion comprises first and second strings of linear prisms that are regularly repeatedly formed in parallel to each other, said linear prisms having propagation portions for propagating said light from said external source and reflection portions for reflecting said light, wherein a first repetition direction of said first string of linear prisms, in a predetermined area in contact with said incident surface portion and in contact with a first end surface adjacent to said incident surface portion, is set in a first inclination direction inclining from said incident surface portion to said first end surface, and wherein a second repetition direction of said second string of linear prisms, in an area other than said predetermined area, is set in a second inclination direction inclining from said incident surface portion to a second end surface opposite to said first end surface.

9. The liquid crystal display according claim 8, wherein an included angle $\alpha$ between a vertical direction of said first inclination direction and said incident surface portion and an included angle $\beta$ between a vertical direction of said second inclination direction and said incident surface portion are set as follow:

$$20° \leq \alpha \leq 35° \text{ and } 20° \leq \beta \leq 35°.$$

10. The liquid crystal display according to claim 8, wherein said predetermined area in said prism surface portion is arranged except an area corresponding to said display screen.

11. A liquid crystal display comprising:
a light source having an emission portion of a predetermined length;
a light conductor comprising:
an incident surface portion which is longer than said emission portion of said light source, a prism surface portion and an outgoing surface portion, wherein when light is supplied from a light source via said incident surface portion, said light is reflected on said prism surface portion as a first reflected light, said prism surface portion outputs said first reflected light to an object through said outgoing surface portion, said outgoing surface portion receives a second reflected light reflected off said object and outputs said second reflected light to a viewpoint of an observer via said prism surface portion, wherein said display further comprises a liquid crystal panel that receives said first reflected light from said outgoing surface portion and for performing display screen control so as to reflect light as said second reflected light to said light conductor, wherein said prism surface portion comprises first and second strings of linear prisms that are regularly repeatedly formed in parallel to each other, said linear prisms having propagation portions for propagating said light from said external source and reflection portions for reflecting said light, wherein a first repetition direction of said first string of linear prisms, in a predetermined area in contact with said incident surface portion and in contact with a first end surface adjacent to said incident surface portion, is set in a first inclination direction inclining from said incident surface portion to said first end surface, and wherein a second repetition direction of said second string of linear prisms, in an area other than said predetermined area, is set in a second inclination direction inclining from said incident surface portion to a second end surface opposite to said first end surface.

12. The liquid crystal display according claim 11, wherein an included angle $\alpha$ between a vertical direction of said first inclination direction and said incident surface portion and an included angle $\beta$ between a vertical direction of said second inclination direction and said incident surface portion are set as follows:

$$20° \leq \alpha \leq 35° \text{ and } 20° \leq \beta \leq 35°.$$

13. The liquid crystal display according to claim 11, wherein said predetermined area in said prism surface portion is arranged except an area corresponding to said display screen.

* * * * *

UNITED STATES PATENT AND TRADEMARK OFFICE
CERTIFICATE OF CORRECTION

| | | |
|---|---|---|
| PATENT NO. | : 7,042,534 B2 | Page 1 of 1 |
| APPLICATION NO. | : 10/140397 | |
| DATED | : May 9, 2006 | |
| INVENTOR(S) | : Fujishiro | |

It is certified that error appears in the above-identified patent and that said Letters Patent is hereby corrected as shown below:

Title Page, Item (56)

The References cited should include JP 2000-162595 6/2000.

Claim 7, Col. 18, line 52, "a vertial direction" should be --a vertical direction--.

Signed and Sealed this

Twenty-seventh Day of January, 2009

JOHN DOLL
*Acting Director of the United States Patent and Trademark Office*